(12) United States Patent
Krah et al.

(10) Patent No.: US 8,363,021 B2
(45) Date of Patent: Jan. 29, 2013

(54) METHOD TO COMPENSATE FOR THE FREQUENCY DEPENDENCE OF SENSE SIGNAL PREPROCESSING

(75) Inventors: Christoph Horst Krah, Los Altos, CA (US); Yutaka Hori, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 621 days.

(21) Appl. No.: 12/558,397

(22) Filed: Sep. 11, 2009

(65) Prior Publication Data

US 2011/0063229 A1  Mar. 17, 2011

(51) Int. Cl.
*G06F 3/041* (2006.01)

(52) U.S. Cl. ......... 345/173; 345/174; 345/204; 345/214

(58) Field of Classification Search .................. None
See application file for complete search history.

(56) References Cited

U.S. PATENT DOCUMENTS

| | | | |
|---|---|---|---|
| 5,175,621 A * | 12/1992 | Maesato | 348/676 |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 * | 11/2001 | Westerman et al. | 345/173 |
| 6,545,535 B2 * | 4/2003 | Andre | 330/149 |
| 6,690,387 B2 | 2/2004 | Zimmerman et al. | |
| 7,015,894 B2 | 3/2006 | Morohoshi | |
| 7,095,992 B2 * | 8/2006 | Kim et al. | 455/180.3 |
| 7,184,064 B2 | 2/2007 | Zimmerman et al. | |
| 7,518,461 B1 * | 4/2009 | McCune et al. | 332/145 |
| 7,663,607 B2 | 2/2010 | Hotelling et al. | |
| 7,768,732 B2 * | 8/2010 | Ozdemir | 360/65 |
| 7,881,563 B2 * | 2/2011 | Mandy et al. | 382/300 |
| 2003/0086026 A1 * | 5/2003 | Kim | 348/806 |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2008/0130789 A1 * | 6/2008 | Copeland et al. | 375/297 |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Dismery Mercedes
(74) *Attorney, Agent, or Firm* — Morrison & Foerster LLP

(57) ABSTRACT

Compensating for the frequency dependence of sense signal preprocessing in preprocessing channel circuitry is provided. The frequency dependence of the preprocessing channels can be modified to change a frequency dependent channel into a frequency independent channel, to change a frequency independent channel into a frequency dependent channel, or to change the frequency dependency characteristics of a frequency dependent channel. Modification of frequency dependency may be accomplished, for example, by modifying certain parameters of a preprocessing channel's components, which can include components for amplifying, filtering, phase adjusting, demodulating, decrypting, for example. A pipelined process may be used to modify the frequency dependency of multiple channels. Compensating for frequency dependencies can have multiple advantages, such as reduction of memory requirements and DIE size.

25 Claims, 17 Drawing Sheets

U.S. PATENT DOCUMENTS

2008/0157882 A1* 7/2008 Krah .................................. 331/18
2009/0237151 A1* 9/2009 Yoshida et al. ................ 327/539

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

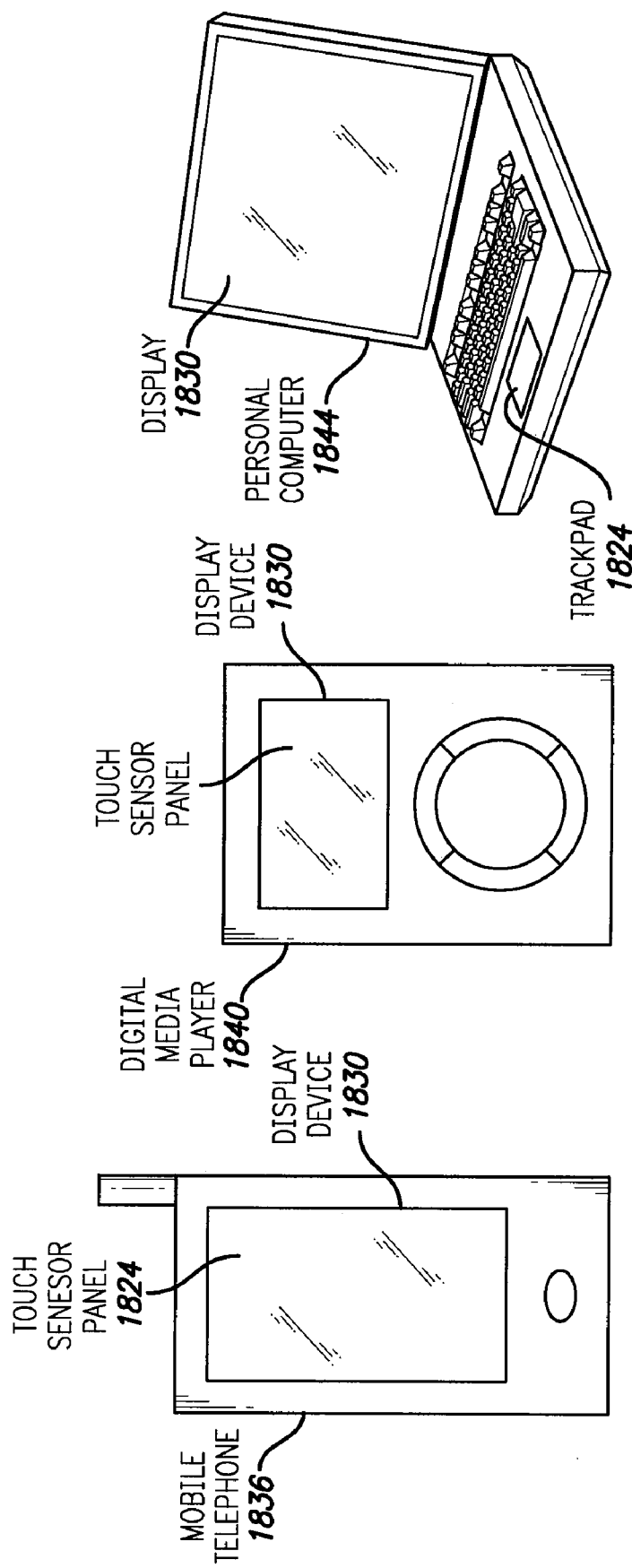

METHOD TO COMPENSATE FOR THE FREQUENCY DEPENDENCE OF SENSE SIGNAL PREPROCESSING

FIELD

This relates generally to preprocessing of sense signals received by an analog front end channel in a touch sensing system, and in particular, to compensation of frequency dependencies of the analog front end channel in a touch sensing system.

BACKGROUND

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a transparent touch sensor panel positioned in front of a display device such as a liquid crystal display (LCD), or an integrated touch screen in which touch sensing circuitry is partially or fully integrated into a display, etc. Touch screens can allow a user to perform various functions by touching the touch screen using a finger, stylus or other object at a location that may be dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material such as Indium Tin Oxide (ITO), often arranged in rows and columns in horizontal and vertical directions on a substantially transparent substrate. Drive signals can be transmitted through the drive lines, which can result in the formation of static mutual capacitance at the crossover points or adjacent areas (sensing pixels) of the drive lines and the sense lines. The static mutual capacitance, and any changes to the static mutual capacitance due to a touch event, can be determined from sense signals that can be generated in the sense lines due to the drive signals.

SUMMARY

This relates generally to preprocessing of sense signals in a touch sensing system, and in particular, to compensating for the frequency dependence of sense signal preprocessing in preprocessing channel circuitry. A frequency dependency introduced by one or more components of the preprocessing channel can be modified, for example. In particular, it may be desirable that the preprocessing channel is frequency independent, so that, for example, the output of the preprocessing channel may be used directly without the need for adjustment or modification. In some situations, a frequency dependent preprocessing channel may be desirable, for example, to compensate for another frequency dependency elsewhere in the system. The frequency dependence of the preprocessing channels can be modified to change a frequency dependent channel into a frequency independent channel, to change a frequency independent channel into a frequency dependent channel, or to change the frequency dependency characteristics of a frequency dependent channel. Modification of frequency dependency may be accomplished, for example, by modifying certain parameters of a preprocessing channel's components, which can include components for amplifying, filtering, phase adjusting, demodulating, decrypting, for example. Compensating for frequency dependencies can have multiple advantages, such as reduction of memory requirements and DIE size.

BRIEF DESCRIPTION OF THE DRAWINGS

The present disclosure, in accordance with one or more various embodiments, is described in detail with reference to the following figures. The drawings are provided for purposes of illustration only and merely depict example embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 18A illustrates an example mobile telephone that can include frequency dependence modification of a preprocessing channel according to the various embodiments described herein.

FIG. 18B illustrates an example digital media player that can include frequency dependence modification of a preprocessing channel according to the various embodiments described herein.

FIG. 18C illustrates example personal computer that can include frequency dependence modification of a preprocessing channel according to the various embodiments described herein.

DETAILED DESCRIPTION

Figure 1:
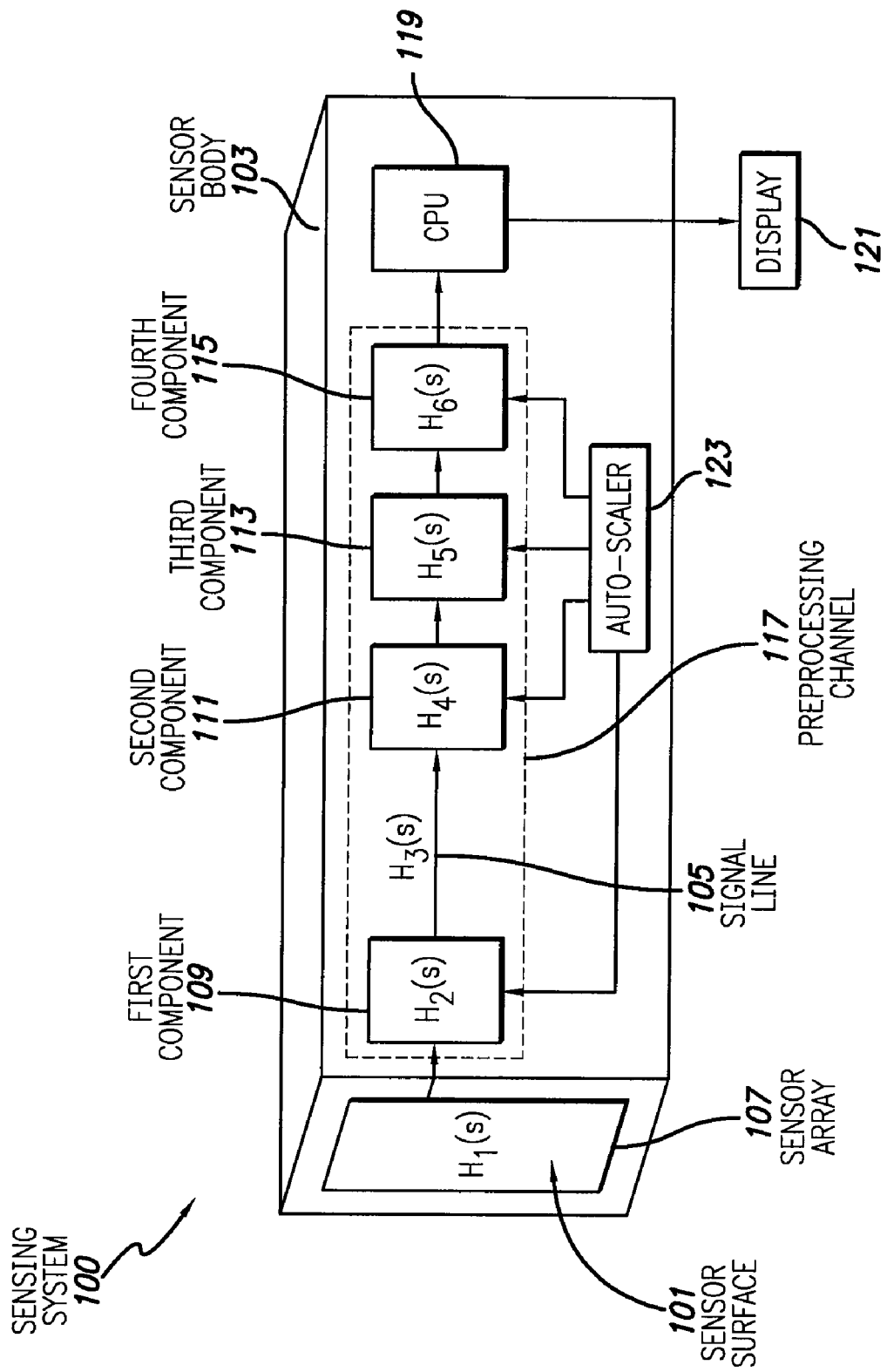
FIG. 1 illustrates an example touch sensing system according to embodiments of the disclosure.

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

This relates generally to preprocessing of sense signals in a touch sensing system, and in particular, to compensating for the frequency dependence of sense signal preprocessing in preprocessing channel circuitry. For example, in some touch sensing systems, one or more components of the preprocessing channel may introduce a frequency dependency, that is, may cause the preprocessing channel to operate differently or to produce a different result depending on the frequency of the sense signal. However, it may be desirable that the preprocessing channel is frequency independent, so that, for example, the output of the preprocessing channel may be used directly without the need for adjustment or modification. On the other hand, a frequency dependent preprocessing channel may be desirable in some touch sensing systems, for example, to compensate for another frequency dependency elsewhere in the system. Described below in more detail are example touch sensing systems in which the frequency dependence of the preprocessing channels can be modified to change a frequency dependent channel into a frequency independent channel, to change a frequency independent channel into a frequency dependent channel, or to change the frequency dependency characteristics of a frequency dependent channel. Various embodiments may accomplish this by, for example, modifying certain parameters of a preprocessing channel's components, which can include components for amplifying, filtering, phase adjusting, demodulating, decrypting, for example. Compensating for frequency dependencies can have multiple advantages, such as reduction of memory requirements and DIE size. For example, changing the pre-amplifiers feedback network from capacitive to resistive introduces the frequency dependency, but DIE real estate is saved since a feedback resistor consumes much less DIE real estate than a feedback capacitor. There can be some DIE increase due to the requirement for an auto-scaler, but the incremental increase can be much smaller than the decrease in DIE size due to adding the auto-scaler, as it can implemented in logic.

Various embodiments may be applicable to touch sensing systems based on various sensing technologies, such as ultrasonic, light, infrared, electromagnetic (EM), acoustic, electrical such as resistive-type sensors, capacitive-type sensors, etc. Example embodiments of a sensing system that utilizes ultrasound are described with respect to FIGS. 1-2. Various capacitive-type example embodiments are described with respect to FIGS. 3-17. With regard to capacitive-type sensors, various embodiments may be applicable to, for example, mutual-capacitance sensors, self-capacitance sensors, single and multi-touch sensors, sensors in which single stimulation signals are used, sensors in which multiple simultaneous stimulation signals are used to generate a composite sense signal, sensors with different drive/sense line configurations such as Cartesian coordinate, polar coordinate, and non-orthogonal configurations, segmented lines, non-segmented lines, and various touch sensor panel configurations, such as configurations in which the drive and sense lines are formed on the back of a cover glass, on the same side of a single substrate, or integrated with the circuitry of a display screen, such as a liquid crystal display (LCD) stackup.

FIG. 1 shows an example embodiment of a touch sensing system 100 that includes a sensor surface 101 and a sensor body 103. In this example, sensor system 100 is an ultrasonic sensing system that detects ultrasonic waves; however, other embodiments may detect, for example, visible light, infrared radiation, or other electromagnetic (EM) phenomena, electrical phenomena such as capacitance, sound waves, etc. In operation, an ultrasonic transmitter (not shown) can transmit ultrasonic stimulation signals of different frequencies, which are reflected by an object (not shown). A sensor array 107 can sense ultrasonic stimulation signals impinging its surface and can transmit corresponding sense signals to a first component 109. First component 109 can process the sense signals and transmit them through signal line 105 to be processed by a second component 111, a third component 113, and a fourth component 115. The group of components including first component 109, signal line 105, second component 111, third component 113, and fourth component 115 can form a preprocessing channel 117 that performs initial processing of sense signals received by sensor array 107. This initial processing can be performed to make the sense signals better suited for use in the system by, for example, boosting the signals, cleaning the signals, collecting the signals, demodulating the signals, etc.

Touch sensing system 100 can include an auto-scaler 123 that can modify the frequency dependence of various components of preprocessing channel 117 by modifying internal and/or external parameters of the components, as described below in more detail. In this regard, each component of the preprocessing channel of sensor system 100 can modify the sense signals in some way. The way in which a component operates to modify a signal in the preprocessing channel can be characterized by the component's transfer function, $H(s)$, where s is the set of parameters on which the transfer function depends. FIG. 1 shows transfer function $H_1(s)$ of sensor array 107 and transfer functions $H_2(s)$, $H_3(s)$, ... $H_6(s)$ of the components of preprocessing channel 117.

Figure 2:
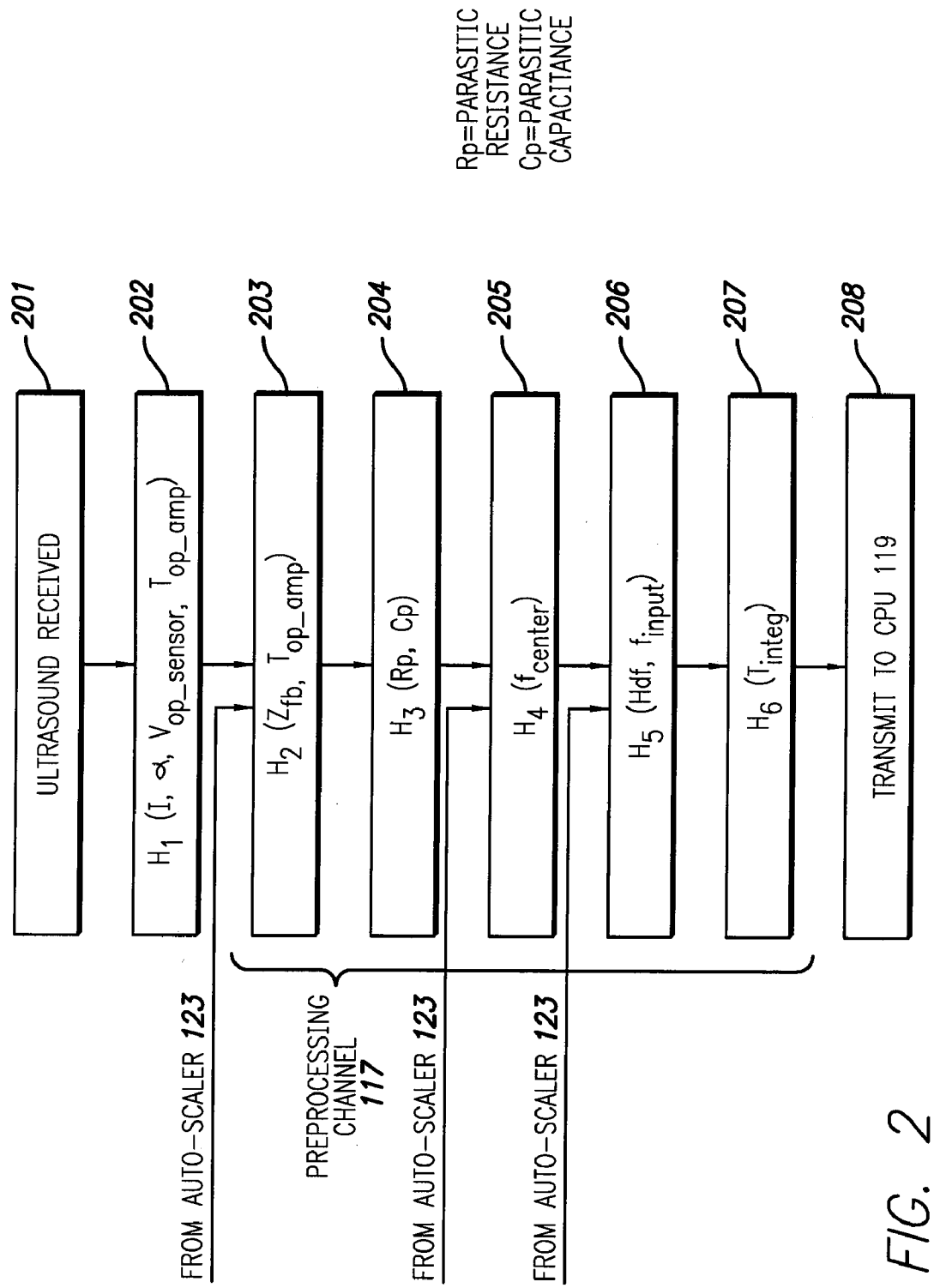
FIG. 2 illustrates an example operation of a preprocessing channel according to embodiments of the disclosure.

FIG. 2 is a flowchart showing more detail of an example operation of preprocessing channel 117 with reference to the transfer functions of the components. In the example of FIG. 2, ultrasonic waves can be received (201), and sensor array 107, for example, can convert (202) the ultrasonic waves into electrical signals according to transfer function $H_1(s)$. The electrical signal output from sensor array 107 may depend upon, for example, the intensity (I) of the ultrasonic waves, the incident angle ($\alpha$) of the ultrasonic waves to the surface of the sensor array, the operational voltage ($V_{op\_sensor}$) applied to the sensor array, the ambient temperature ($T_{amb}$), etc. First component 109 may be, for example, a preamplifier that amplifies (203) the electrical signals by a gain according to transfer function $H_2(s)$, which may depend on, for example, the parameters of the preamp, such as the impedance of the feedback network and the operating temperature ($T_{op\_amp}$), etc.

Signals traveling through signal line 105 can be modified (204) by the physical signal line 105 according to a transfer function $H_3(s)$. For example, signal line 105 may modify (204) signals by attenuating the signals in a predetermined way due to the parasitic properties of the line, such as parasitic resistance and capacitance and also by allowing an indeterminate amount of environmental noise to be introduced into the signals. In other words, $H_3(s)$ may include a known portion, $H_{known}$, and an unknown portion, $H_{unknown}$. The signal attenuation, $H_{known}$, may depend on, for example, the length (l) of signal line 105 and the resistance per unit length ($\Omega_{per\_length}$) of the signal line.

The adjustment of the individual parameters for the individual stages can be a function of environmental conditions, such as temperature, environmental noise introduced at the sensor array, conducted noise introduced into the supply rails of the different components and internal noise introduced by the components themselves. For example, it may be required to reduce the gain of the pre-amplifier in the first component to accommodate the extra environmental noise and prevent the pre-amplifier from saturating in the presence of that environmental noise. This may be an adaptive process.

Other signal lines in preprocessing channel 117 may not significantly modify signals transmitted through them, and therefore have transfer functions equal to one, i.e., unity transfer functions. For the sake of simplicity, these signal lines, and other preprocessing channel components that may have a unity transfer function, are not included in the description below. However, some embodiments may include one or more components with a unity transfer function that can be modified to add a frequency dependency.

Other components in sensor system 100 have associated transfer functions. For example, second component 111 may be, for example, a band-pass filter that filters (205) the signals according to $H_4(s)$, which can depend on a center frequency ($f_{center}$) of the band-pass filter. Third component 113 may be, for example, a sigma-delta analog-to-digital converter that digitizes the signal according to $H_5(s)$, which may depend on the characteristics of its decimation filter and the frequency of the input signal ($f_{input}$). Fourth component 115 may be, for example, a demodulator that demodulates and accumulates (207) the signals according to $H_6(s)$, which may depend on an integration period ($t_{integ}$). After processing by preprocessing channel 117, the resulting signals are transmitted (208) to, for example, a CPU 119. The signals from preprocessing channel 117 may be used by CPU 119 for a variety of applications. For example, CPU 119 may execute a cursor movement program that moves a cursor on a display 121 based on the motion of a touch object detected on or near sensor surface 101 using ultrasonic signals.

Some of the transfer functions of the system components may depend on certain environmental or operational conditions, for example. In some embodiments, one or more of the system component transfer functions may depend on frequency of the sense signals.

For some systems, it may be acceptable or even desirable that the processing performed by some or all of the components of the preprocessing channel depends in a particular way on the frequency of the sense signals. For example, in some systems, a frequency dependence of one or more components in the preprocessing channel may be adjusted to reduce or negate a frequency dependence elsewhere in the system, i.e., a frequency dependence external to the one or more components being adjusted. In touch sensing system 100, for example, the amplitude of the sense signals output by sensor array 107 may be dependent on the frequency of the stimulation signals, perhaps due to the particular nature of the sensor array. In other words, the sensor array 107 may impart a frequency dependent gain on the sense signals. Therefore, it may be desirable to reduce or eliminate this frequency dependent gain in preprocessing channel 117 with a compensating frequency dependent gain.

Referring to the example operation of preprocessing channel 117 shown in FIG. 2, first component 109 can be an amplifier that amplifies (203) the signal from sensor array 107 by a particular gain according to transfer function $H_2(s)$. Transfer function $H_2(s)$ shown in FIG. 2 can be frequency independent, i.e., sense signal frequency is not a parameter of $H_2(s)$. However, auto-scaler 123 can adjust the negative feedback impedance Zfb(s) of the amplifier to make its transfer function $H_2(s)$ dependent on sense signal frequency, $f_{sense}$:

$$H_{2\_adjusted}(s)=H_2(Zfb(s),T_{op\_amp})$$

More specifically, the adjusted transfer function's dependence on the sense signal frequency can reduce or negate the sense signal's dependence on stimulation signal frequency imparted by sensor array 107, such that the output of second component 109 is independent of stimulation signal frequency.

In other embodiments, the preamplifier used for first component 109 may not be inherently independent of frequency, but may already have some frequency dependence before being adjusted by auto-scaler 123. In this case, auto-scaler 123 may adjust a parameter of the preamplifier to modify an already-existing frequency dependency to a frequency dependency that can compensate for sensor array 107, for example.

Some components of preprocessing channel 117 may have a frequency dependency that can be reduced or eliminated by adjusting an internal parameter of the component. In other words, some frequency dependent components can be made frequency independent by adjusting a parameter of the component, rather than making adjustments elsewhere in the system. Referring to the example operation of preprocessing channel 117 shown in FIG. 2, third component 113 digitizes (206) signals according to $H_5(s)$. Transfer function $H_5(s)$ depends on input signal frequency $f_{input}$, but auto-scaler 123 can adjust the frequency response Hdf of the decimation filter based on input signal frequency, such that the frequency dependence of $H_5(s)$ is reduced or eliminated:

$$H_{5\_adjusted}(s)=H_5(Hdf(-f_{input}),f_{input})$$

In this case, an internal parameter, Hdf, of a frequency dependent component, third component 113, is adjusted to make the component operate as a frequency independent component, i.e., remove or reduce frequency as a parameter of the component's transfer function.

It may be desired that some components of preprocessing channel 117 have a frequency dependent operation that produces a frequency independent effect or result. For example, referring to the example transfer functions of the components shown in FIG. 2, it may be desirable that the center frequency of $H_4(s)$ is tuned to the frequency of the sense signal, such that undesired input signals or noise sources of different frequencies are attenuated. In some embodiments, a parameter of $H_4(s)$ may be adjusted by auto-scaler 123 such that the transfer function operates at one of a plurality of center frequencies, each center frequency corresponding to a particular frequency range of the input signal. In other words, the center frequency of $H_4(s)$ can be "tuned" to particular input signal frequency bands.

In the case that input signal frequency can vary, a "tuned" band-pass filter transfer function, such as $H_4(s)$ in this example, may produce a filtering effect that is more independent of input signal frequency than a typical band-pass filter with a non-adjustable cutoff frequency. More specifically, while "tuned" $H_4(s)$ has a transfer function that depends on input signal frequency, the filtering effect can be tuned to input signal frequency such the substantially the same filtering effect can be applied to the input signals over a wide range of frequencies. In contrast, the non-adjustable band-pass filter can produce a vastly different filtering effect for signals of different frequencies, particularly when input signal frequencies are close to, or exceed, the fixed center frequency.

A brief summary of a difference between the operation of a preprocessing channel component and the result or effect of the operation, and how frequency dependence of operation can be different from frequency dependence of the result or effect of the operation, is now provided. The operation of a component can be characterized by the component's transfer function, which defines how the component modifies input signals into output signals. If the operation of a component depends on the input signal frequency, the transfer function of the component includes input signal frequency as one of the transfer function parameters, i.e., the transfer function is a function of the input signal frequency. In contrast, a result or effect of the operation may be characterized irrespective of input signal frequency.

For example, processing an input signal of a predetermined frequency, e.g., a carrier frequency, with a bandpass filter centered on the predetermined frequency can have the effect of "cleaning" the input signal, or more specifically, can have the effect of filtering out frequencies that are not within the bandpass range of the bandpass filter. However, if the bandpass filter operation does not depend on input signal frequency, input signals with frequencies outside of the range of the bandpass filter will not be cleaned. On the contrary, these input signals will be filtered out. Therefore, in this example, a bandpass filter that operates independent of input signal frequency (e.g., has a fixed center frequency and range) can produce a frequency dependent result, i.e., input signals within a frequency range of the bandpass filter are cleaned, while input signals outside of the range are not cleaned.

On the other hand, a bandpass filter with a center frequency adjustable to the frequency of the input signal operates dependent on the input signal frequency, but produces a frequency independent result, i.e., input signals are cleaned irrespective of the frequency of the input signal. In other words, in this example, a bandpass filter whose center frequency can be tuned to the input signal frequency would provide the same cleaning regardless of the frequency of the input signal. In this case, in order to achieve the desired frequency independence of the result or effect, (i.e., that regardless of its frequency, the input signal is cleaned), it is necessary for the operation of the bandpass filter to be dependent on frequency of the input signal. Therefore, in some embodiments there may be a distinction between a frequency dependence of the operation of a component and a frequency dependence of result or effect of the operation of the component.

Similarly, in some embodiments there may be a distinction between frequency dependence of a result or effect of a group of components and frequency dependence of a result or effect of individual components of the group. For example, in some embodiments, a frequency dependence of one component of the preprocessing channel may counteract a frequency dependence of another component of the preprocessing channel such that the overall frequency dependence of the preprocessing channel is negligible, that is, the result or effect of the operation of the preprocessing channel is independent of input signal frequency. Likewise, in some embodiments, a frequency dependence of the preprocessing channel may counteract a frequency dependence that manifests outside of the preprocessing channel, for example, before the input signals are received by the preprocessing channel, during additional signal processing occurring after the preprocessing channel, etc.

Figure 3:
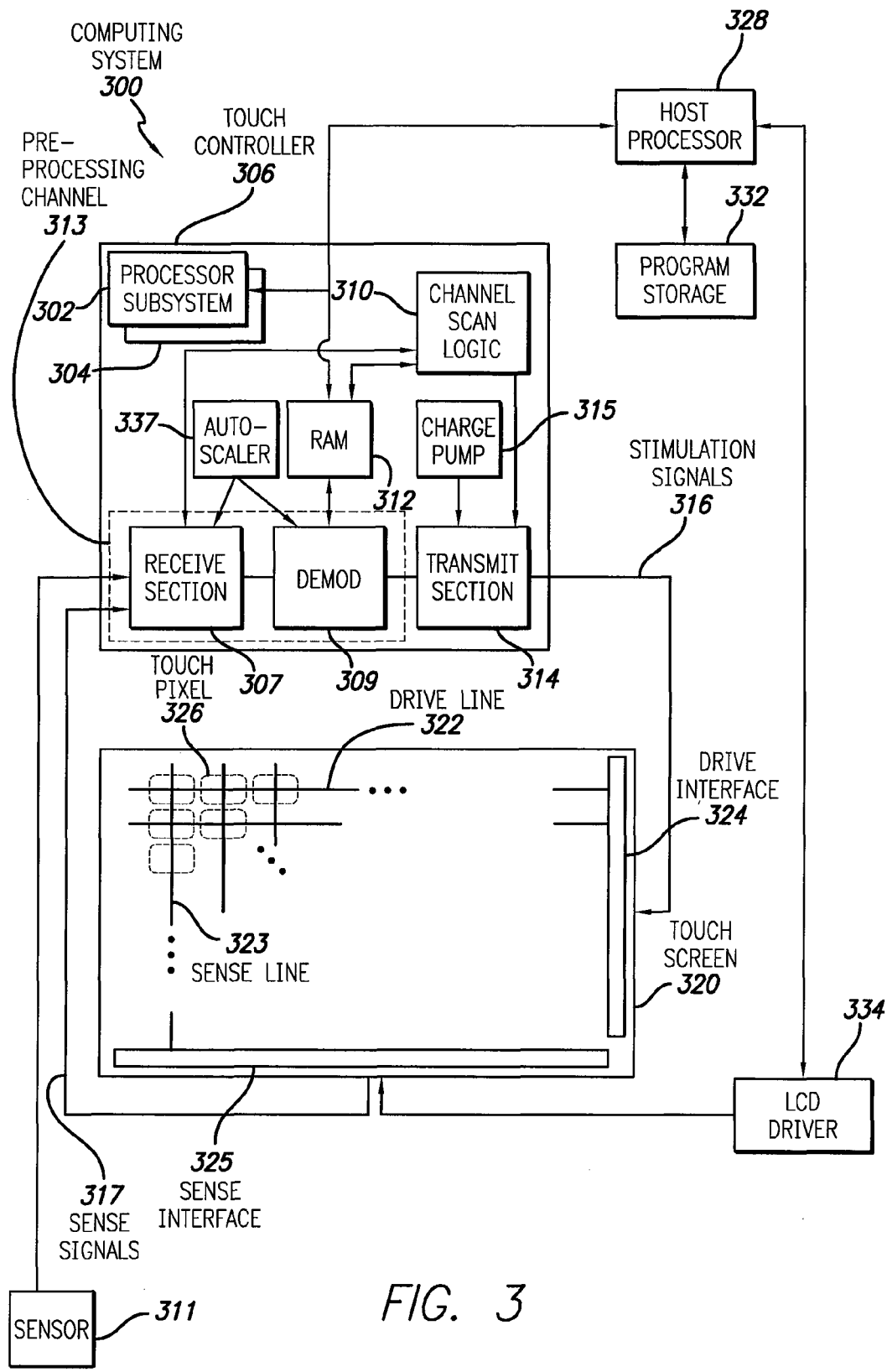
FIG. 3 illustrates an example computer system according to embodiments of the disclosure.

FIG. 3 is a block diagram of example embodiment of a computer system including a touch sensing system that is based on capacitive-type sensing of a computing system 300. For example, by detecting changes in capacitance at each of a plurality of touch pixels of a touch screen and noting the position of the touch pixels, the touch sensing system can recognize multiple objects, and determine one or more of the location, pressure, direction, speed and acceleration of the objects as they are moved across the touch screen.

Computing system 300 can be a mutual capacitive touch screen system; however, other embodiments can be implemented using touch sensors that utilize other types of sensing technologies, for example, self capacitive, resistive, optical, acoustic, and may be implemented in sensors that detect other things, for example, light, sound, electricity, etc. By way of example, some embodiments of an integrated touch sensing system may be based on self capacitance and some embodiments may be based on mutual capacitance. In a self capacitance based touch system, each of the touch pixels can be formed by an individual electrode that forms a self-capacitance to ground. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by the touch sensing system to determine the positions of multiple objects when they touch the touch screen. In a mutual capacitance based touch system, the touch sensing system can include, for example, drive regions and sense regions, such as drive lines and sense lines. In one example case, drive lines can be formed in rows while sense lines can be formed in columns (e.g., orthogonal). The touch pixels can be provided at the intersections or adjacent areas of the rows and columns. During operation, the rows can be stimulated with an AC waveform and a mutual capacitance can be formed between the row and the column of the touch pixel. As a conductive object approaches the touch pixel, some of the electric field coupled between the row and column of the touch pixel is instead shunted by the object to AC ground. This reduction in electric field across the touch pixel results in a net decrease in the mutual capacitance between the row and the column and a reduction of the charge coupled through the mutual capacitance. This reduction in the charge can be detected and measured by the touch sensing system to determine the positions of multiple objects when they touch the touch screen. In some embodiments, an integrated touch screen can be multi-touch, single touch, projection scan, full-imaging multi-touch, or any other form of capacitive touch.

Computing system 300 can include a host processor 328 for receiving outputs from processor subsystem 302 and performing actions based on the outputs. For example, host processor 328 can be connected to program storage 332 and a display controller, such as an LCD driver 334. Host processor 328 can control LCD driver 334 to generate an image on touch screen 320, such as an image of a user interface (UI), and can control processor subsystem 302 and touch controller 306 to detect a touch on or near touch screen 320, such a touch input to the displayed UI. The touch input can be used by computer programs stored in program storage 332 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 328 can also perform additional functions that may not be related to touch processing.

Computing system 300 can utilize a single-ASIC multi-touch controller 306. Touch controller 306 can be a single application specific integrated circuit (ASIC) that can include one or more processor subsystems 302, which can include, for example, one or more main processors, such as ARM968 processors or other processors with similar functionality and capabilities. However, in other embodiments, the processor functionality can be implemented instead by dedicated logic, such as a state machine. Processor subsystem 302 can also include, for example, peripherals 304 such as random access memory (RAM) or other types of memory or storage, watchdog timers and the like. Touch controller 306 can also include a preprocessing channel 313 including, for example, a receive section 307 and a demodulation section such as multistage vector demod engine 309. Receive section 307 can include sense channels (not shown) for receiving signals, such as sense signals 317 from a touch screen 320, other signals from other sensors such as sensor 311, etc. Signals processed by receive section 307 can be transmitted to a demodulation section such as multistage vector demod engine 309 to demodulate the signals and store the result in a RAM 312, which can be accessed by processor subsystem 302 and/or host processor 328. Touch controller 306 includes an autoscaler 337 that can modify a frequency dependency of one or more circuit components of preprocessing channel 313.

Touch controller 306 can also include a channel scan logic 310, and a drive system including, for example, a transmit section 314. Channel scan logic 310 can access RAM 312, autonomously read data from the sense channels and provide control for the sense channels. In addition, channel scan logic 310 can control transmit section 314 to generate stimulation signals 316 at various frequencies and phases that can be selectively applied to drive lines of the touch sensing circuitry of touch screen 320, as described in more detail below. A charge pump 315 can be used to generate the supply voltage for the transmit section. The stimulation signals 316 (Vstim) that can have amplitudes higher than the maximum voltage the ASIC process can tolerate by cascoding transistors. Therefore, the stimulus voltage can be higher (e.g. 6V) than the voltage level a single transistor can handle (e.g. 3.6 V). Although FIG. 3 shows charge pump 315 separate from transmit section 314, the charge pump can be part of the transmit section.

Drive lines 322 can be driven by stimulation signals 316 from transmit section 314 through a drive interface 324, and resulting sense signals 317 generated in sense lines 323 are transmitted through a sense interface 325 to sense channels in receive section 307 in touch controller 306. In this way, drive lines and sense lines are part of the touch sensing circuitry that can interact to form capacitive sensing nodes, which can be thought of as touch picture elements (touch pixels), such as touch pixel 326. This way of understanding can be particularly useful when touch screen 320 is viewed as capturing an "image" of touch. In other words, after touch controller 306 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 4A:
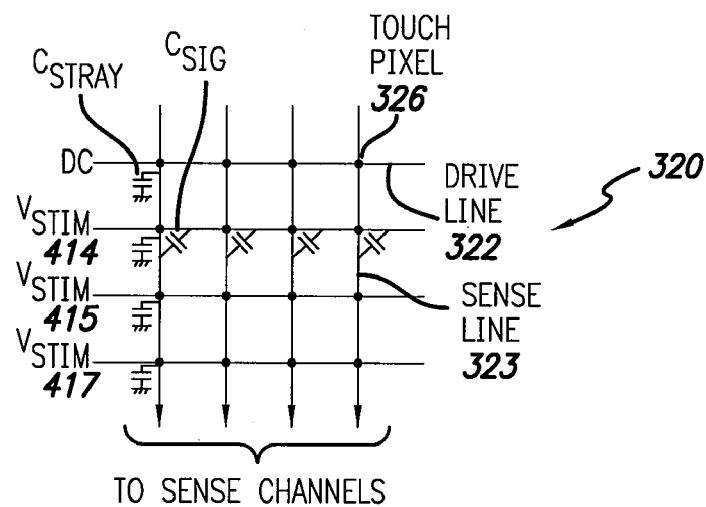
FIGS. 4A, 4B, and 4C illustrate an example touch sensing operation according to embodiments of the disclosure.

FIG. 4A is a partial view of example touch screen 320 that shows more detail. FIG. 4A indicates the presence of a stray capacitance Csig at each touch pixel 326 located at the intersection of a drive line 322 and a sense line 323 (although Csig for only one drive line is illustrated in FIG. 4A for purposes of simplifying the figure). In the example of FIG. 4A, stimulation signals 316 transmitted by transmit section 314 can be applied to drive lines 322 of the touch screen. For example, AC stimulus Vstim 414, Vstim 415 and Vstim 417 can be applied to several drive lines, while other drive lines can be connected to DC. Vstim 414, Vstim 415 and Vstim 417 can be, for example, signals having the same or different phases. Each stimulation signal 316 on a drive line 322 can cause a charge Qsig to be injected into the sense lines 323 through the mutual capacitance present at the affected pixels 326, where:

$$Qsig = Csig * Vstim \tag{1}$$

A finger, palm or other object present at one or more of the affected pixels can cause a change in the injected charge (Qsig_sense) that produces sense signals 317 that can be detected on the sense lines 323. Vstim signals 414, 415 and 417 can include one or more bursts of sine waves, square waves, etc. Vstim signals can be comprised of signals with one specific phase, amplitude and frequency but can also be composite in nature, e.g. can be comprised of multiple signals, each having a specific phase, amplitude and frequency. Each signal component can be frequency, phase or amplitude modulated. For example, amplitude modulation can be used for windowing purposes to provide a stimulus signal that is narrowband and has little harmonic content as to prevent unwanted noise sources to enter the sense channel. For example, having a stimulus signal with a square wave-shape can generate higher order harmonics. These higher order harmonics may cause in band noise components due to intermodulation between external noise components with the higher order harmonics of the stimulus. Note that although FIG. 4A illustrates drive lines 322 and sense lines 323 as being substantially perpendicular, they need not be so aligned, as described above. Each sense line 323 can be connected to a sense channel of receive section 307, for example.

Figure 4B:
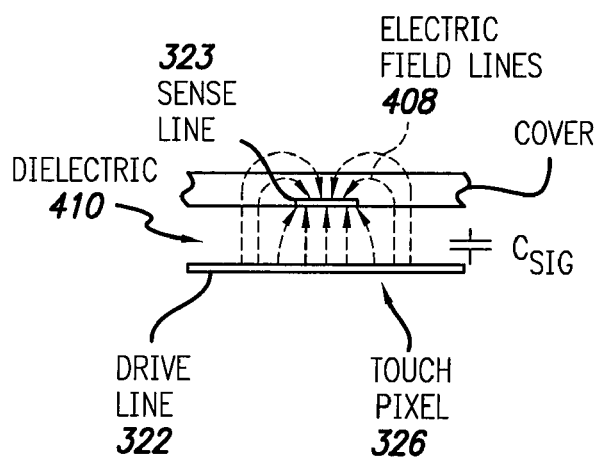

FIG. 4B is a side view of example touch pixel 326 in a steady-state (no-touch) condition according to various embodiments. In FIG. 4B, an electric field of electric field lines 408 of the mutual capacitance between sense lines 323 and drive lines 322 separated by dielectric 410 is shown.

Figure 4C:
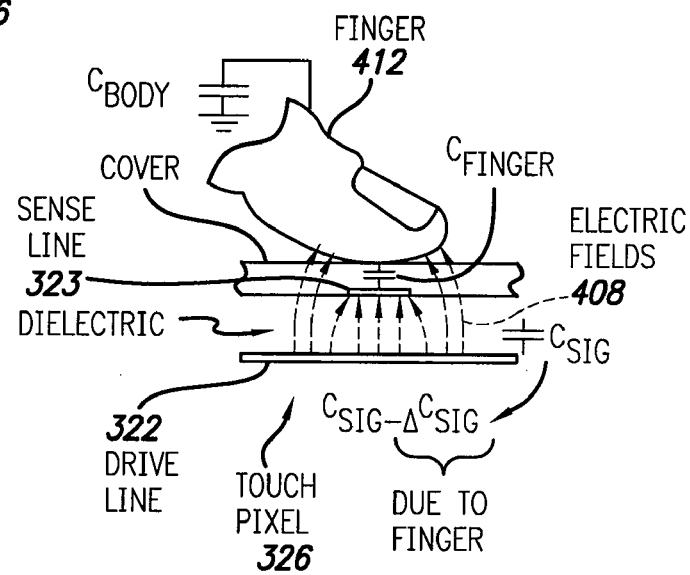

FIG. 4C is a side view of example touch pixel 326 in a dynamic (touch) condition. In FIG. 4C, finger 412 has been placed near touch pixel 326. Finger 412 can be a low-impedance object at signal frequencies, and can have an AC capacitance Cfinger from the sense line 323 to the body. The body can have a self-capacitance to ground Cbody, where Cbody is much larger than Cfinger. If finger 412 blocks some electric field lines 408 between the row and column electrodes (fringing fields that exit the dielectric and pass through the air above the row electrode), those electric field lines can be shunted to ground through the capacitance path inherent in the finger and the body, and as a result, the steady state signal capacitance Csig is reduced by ΔCsig. In other words, the combined body and finger capacitance can act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig-ΔCsig, where Csig represents the static (no touch) component and ΔCsig represents the dynamic (touch) component. Note that Csig-ΔCsig may always be nonzero due to the inability of a finger, palm or other object to block all electric fields, especially those electric fields that remain entirely within the dielectric material. In addition, it should be understood that as a finger is pushed harder or more completely onto the touch screen, the finger can tend to flatten, blocking more and more of the electric fields, and thus ΔCsig can be variable and representative of how completely the finger is pushing down on the touch screen (e.g., a range from "no-touch" to "full-touch").

In order to detect ΔCsig, a capacitive feedback-type preamp in the preprocessing channel can be used to amplify the sense signals. Using a capacitive feedback-type preamp in a preprocessing channel can provide a distinct advantage in some applications because in some applications these types of preamps can operate substantially independent of the frequency of the received signal. In other words, the gain of the preamp can be essentially constant over a range of received signal frequencies. For sensors that receive and process signals of different frequencies, the frequency independent amplification that may be provided by capacitive feedback-type preamps can simplify subsequent signal processing operations such as, for example, filtering, phase adjustment, demodulation, etc.

However, capacitive feedback-type preamps can be relatively large devices. In some applications, the size of the preamp may put a lower limit on the size of the sense channel of the device, which may be particularly undesirable for some applications, such as portable electronic devices.

Other types of preamps, for example, resistive feedback-type preamps, can be smaller in size than capacitive feedback-type preamps. However, the gain of these other preamps can be dependent on signal frequency.

Figure 5:
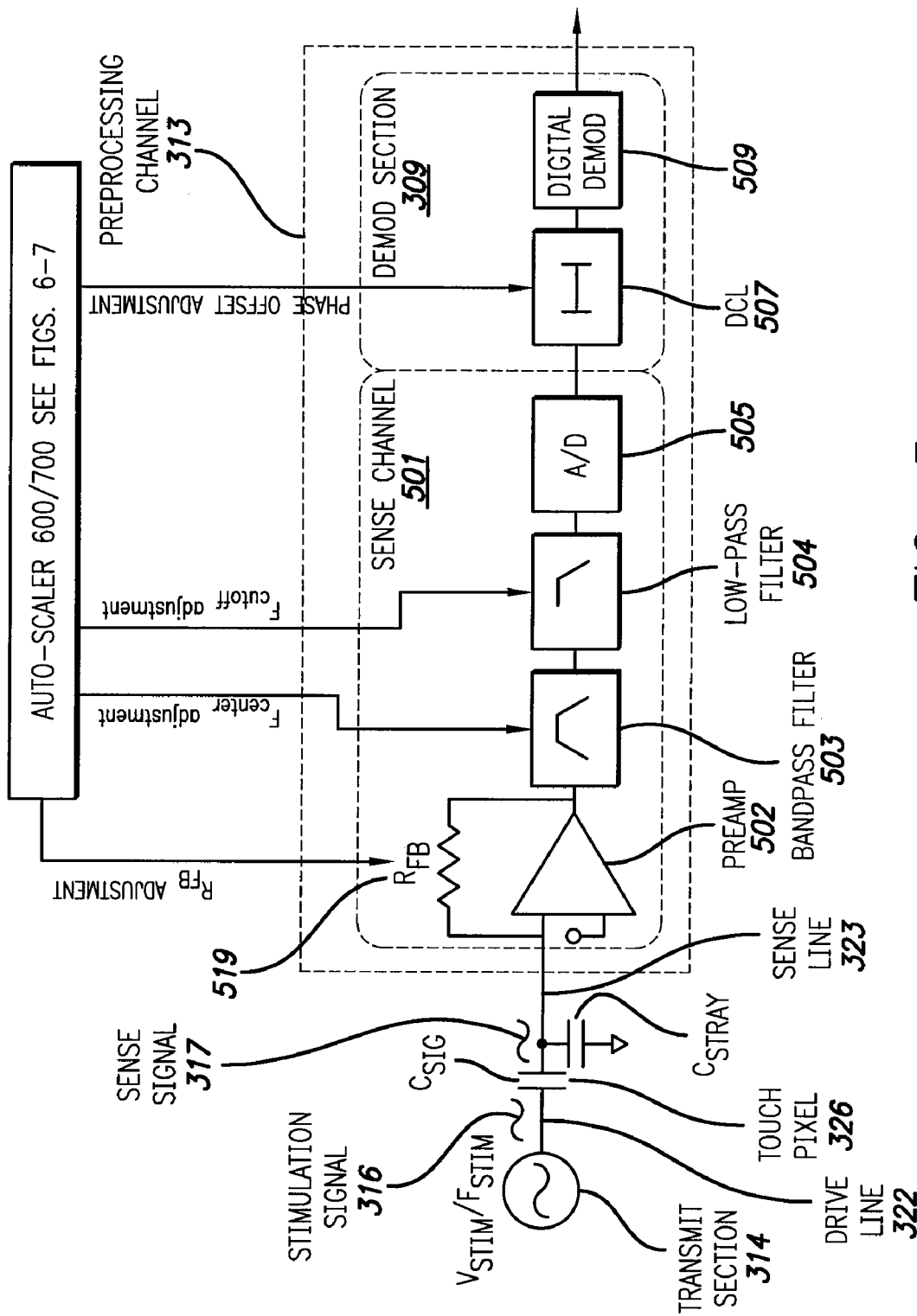
FIG. 5 illustrates an example preprocessing channel according to embodiments of the disclosure.

FIG. 5 illustrates an example embodiment of preprocessing channel 313 that includes a preamplifier with resistive feedback. Sense signals 317 can be received by sense channel 501 of preprocessing channel 313. In sense channel 501, a preamplifier 502 can amplify the sense signals, a bandpass filter (BPF) 503 can filter the amplified signals, a subsequent low-pass filter (LPF) 504 (e.g., anti-aliasing filter) can further low-pass filter the signal and an analog-to-digital converter (ADC) 505 can convert the filtered signals into digital signals. Demod section 309 of preprocessing channel 313 can adjust the phase of the digitized signals with a Digital Control Logic (DCL) 507 and can demodulate the result with a digital demodulator 509. FIG. 5 shows adjustment signals from an auto-scaler 337, such as example auto-scalers 600/700 (see FIGS. 6 and 7, respectively) that can modify parameters of preamp 502, BPF 503, LPF 504, and DCL 507.

The operation of preprocessing channel 313 and the modification of component parameters by auto-scaler 600/700 will now be described in more detail. FIG. 5 shows transmit section 314 transmitting stimulation signal 316 of a particular amplitude, Vstim, and frequency, $\omega_{STIM}$ relative to a common mode voltage Vcm, over one of the drive lines 322. For example, stimulation signal 316 can be a sinusoidal signal:

$$Vstim(t) = Vstim * \sin(\omega_{STIM} * t) + Vcm \quad (2)$$

Stimulation signal 316 on drive line 322 can couple onto sense line 323 at touch pixel 326 based on the value of Csig at the touch pixel. The coupling can produce an injected current, Isig(t), in sense line 323:

$$Isig(t) = Csig * dVstim(t)/dt \quad (3)$$

Substituting equation (2) in equation (3) and differentiating the resulting equation yields:

$$Isig(t) = Csig * Vstim * \omega_{STIM} * \cos(\omega_{STIM} * t) \quad (4)$$

The injected current Isig(t) is sense signal 317, which can be received by sense channel 501 of receive section 307 of preprocessing channel 313. While receive section 307 can have a plurality of sense channels 501, for the purpose of simplicity only a single sense channel 501 is shown in FIG. 5.

Sense signal 317 can be received by preamplifier 502 of sense channel 501. Preamplifier 502 can be a transimpedance amplifier with a feedback resistance, $R_{FB}$, 519. Feedback resistance $R_{FB}$ 519 of preamplifier 502 operates to convert the injected current Isig of sense signal 317 into a voltage at the output of preamplifier 502:

$$Vpreamp\_out(t) = -R_{FB} * Isig(t) \quad (5)$$

Substituting (4) in (5) yields:

$$Vpreamp\_out(t) = -R_{FB} * Csig * Vstim * \omega_{STIM} * \cos(\omega_{STIM} * t) \quad (6)$$

Therefore, signal output from preamplifier 502 can be phase shifted from the stimulation signal by 90 degrees. The gain of preamp 502 with respect to stimulation signal 316 can be represented as:

$$\text{Gain} = Vpreamp\_out/Vstim = -\left(\frac{R_{FB} * Csig * Vstim * \omega_{STIM}}{Vstim}\right) \quad (7)$$

$$\text{Gain} = -(R_{FB} * Csig * \omega_{STIM})$$

Equation (7) represents the ideal transfer function of preamplifier 502, $H_{preamp}(s)$, which has the parameters $R_{FB}$, Csig, and $\omega_{STIM}$. Equation (7) shows that the gain of preamplifier 502 is dependent on the frequency of the sense signal 317, which is dependent on the frequency of the stimulation signal 316. In other words, using different stimulation signal frequencies will cause the gain of preamplifier 502 to vary during operation.

It is apparent to those skilled in the art that the amplifier operates as a high-pass filter with a 6 dB/octave roll-off up to a certain frequency limit that is dependent on the pre-amplifier's feedback network. The feedback network can be comprised of the feedback resistor and the stray capacitance at the inverting input node of the pre-amplifier. This feedback network has lowpass filter response and therefore limits the range in which the pre-amplifier can operate as a true differentiator.

Transmit section 314 can transmit stimulation signals 316 having different frequencies. For example, touch controller 306 may select different frequencies for the stimulation signals based on the frequency characteristics of noise around touch screen 320. In some embodiments, stimulation signals of different frequencies may be used, for example, to allow for particular modulation/demodulation schemes to be implemented. However, a frequency dependent gain of preamp 502 can be undesirable because the resulting variability in maximum output voltage of the preamp can reduce the dynamic range of the preamp, and consequently, reduce the overall signal to noise ratio in the system.

In the present example, $R_{FB}$ 519 can be a variable resistor, and the parameter $R_{FB}$ can be modified by an auto-scaler 600/700, described below in reference to FIGS. 6 and 7, respectively. In particular, $R_{FB}$ is an internal parameter of preamp 501 that can be modified to maintain a substantially constant gain at preamplifier 502 over a range of different stimulation signal frequencies transmitted by transmit section 314. In other words, auto-scaler 600/700 can modify $R_{FB}$ such that preamp 502 is independent of stimulation signal frequency. More specifically, as a result of the modification of $R_{FB}$ the result or effect of preamp 502 (which is the preamp's gain in this case) can be substantially independent of the stimulation signal frequency.

In some embodiments, $R_{FB}$ may be modified to create a particular frequency-dependent behavior of the preamplifier.

For example, a modified frequency dependence of the preamplifier may compensate for a frequency dependence elsewhere in computing system 300 or external to the computer system.

It should be noted that the parameters of transfer function $H_{preamp}(s)$ of preamp 502 include parameters that are internal to and external to the preamp. More specifically, $R_{FB}$ is an internal parameter of preamp 502 because feedback resistor $R_{FB}$ 519 is an internal component of preamp 502. Thus, in the present example, auto-scaler 600/700 can modify the frequency dependence of preamp 502 by modifying an internal parameter ($R_{FB}$) of preamp 502. In some embodiments, frequency dependence may be modified by modifying an external parameter, for example, Vstim. Vstim is an external parameter of preamp 502 that may be modified using components of transmit section 314, for example. In some embodiments, Vstim may be modified to maintain a frequency independence of another effect or result of preamp 502. For example, if it is desirable to vary both Vstim and $\omega_{STIM}$ of the stimulation signals, but it is also desirable that the output voltage of preamp 502 remain substantially the same for different stimulation signals, the Vstim values of the stimulation signals may be modified based on the stimulation signals' $\omega_{STIM}$ values such that the output voltage of preamp 502 is substantially the same for all stimulation signals, even though the stimulation signals have different $\omega_{STIM}$ values. In this case, output voltage is the effect or result of preamp 502 whose frequency dependence is modified, rather than the gain of the preamp as in the present embodiment shown in FIGS. 5-6.

In the present embodiment, transmit section 314 can generate stimulation signals 316 of the same voltage, Vstim, but of different frequencies, $\omega_{STIM}$. In this case, a linear scaling with respect to $\omega_{STIM}$ can be used to scale $R_{FB}$ for different frequencies.

The gains G1,G2 of the preamplifier at a given frequency $\omega_{STIM1}/\omega_{STIM2}$, respectively, are:

$$G1 = -(R_{FB1} * Csig * \omega_{STIM1}) \quad (8)$$

$$G2 = -(R_{FB2} * Csig * \omega_{STIM2}) \quad (9)$$

The gains G1 and G2 should be the same and independent of frequency. Therefore setting G1=G2 and further simplification yield the following equation:

$$R_{FB2} = R_{FB1} * \omega_{STIM1}/\omega_{STIM2} \quad (10)$$

Therefore, $R_{FB2}$ can be obtained by applying a linear scaling factor:

$$\text{Scaling factor} = \omega_{STIM1}/\omega_{STIM2} \quad (11)$$

The scaling factor of equation (11) represents a desired frequency characteristic of the preamplifier's transfer function based on the calibration frequency. In the present example, the scaling factor represents a frequency independence of the transfer function in terms of the calibration frequency. An operator can scale the feedback resistance parameter of the preamp's transfer function by applying the scaling factor to any given value of $R_{FB1}$ to obtain the corresponding value of $R_{FB2}$ for which the gain of preamp 502 would be the same for stimulation signals of frequencies $\omega_{STIM1}$ and $\omega_{STIM2}$.

Figure 6:
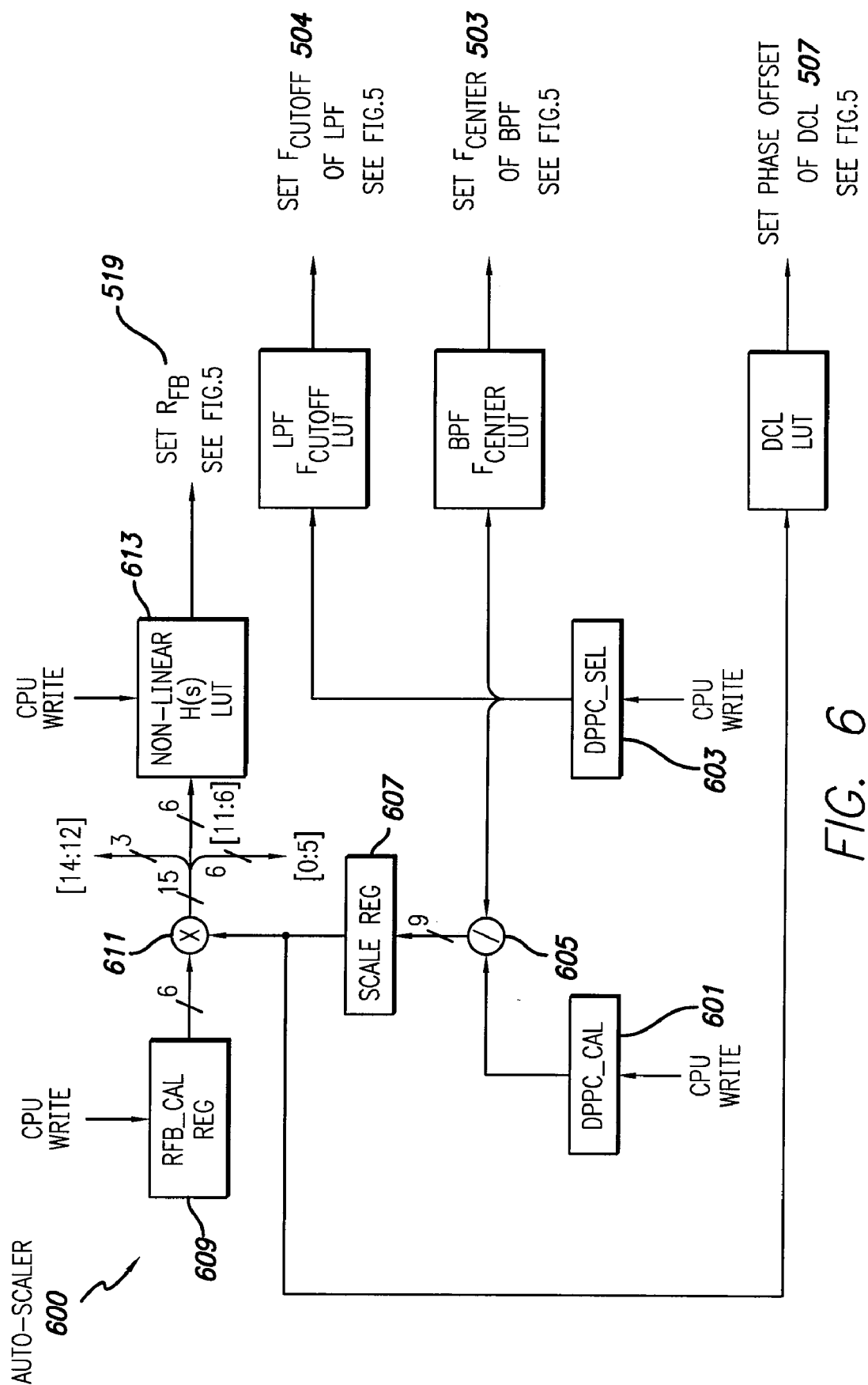
FIG. 6 illustrates an example auto-scaler according to embodiments of the disclosure.

FIG. 6 shows an example auto-scaler 600 that modifies $R_{FB}$ 519 to reduce or eliminate a frequency dependence of preamp 502. In order to utilize the scaling factor of equation (11), an $R_{FB}$ and $\omega_{STIM}$ that result in a satisfactory preamp output voltage (e.g., 0.9 V peak-to-peak) can be determined. The predetermined $R_{FB}$ and $\omega_{STIM}$ pair can be used as calibration values, $R_{FB\_cal}$ and $\omega_{STIM\_cal}$, so that equation (10) becomes:

$$R_{FB\_sel} = R_{FB\_cal} * \omega_{STIM\_cal}/\omega_{STIM\_sel} \quad (12)$$

where $\omega_{STIM\_sel}$ is the currently selected stimulation signal frequency, and $R_{FB\_sel}$ is a corresponding feedback resistance that should be selected for $R_{FB}$ 519. Equation (12) is an example of an operator that scales a parameter of the preamp's transfer function with the linear scaling factor to obtain a scaled value, $R_{FB\_sel}$.

Turning now to FIG. 6, a register 601 can store the transmit NCO phase increment DPPC_CAL associated with the calibration frequency $\omega_{STIM\_cal}$, and a register 603 can store the transmit NCO phase increment DPPC_SEL associated with the currently selected frequency $\omega_{STIM\_sel}$. The currently selected DPPC_SEL associated with frequency $\omega_{STIM\_sel}$ can be selected by a spectrum analyzer, for example, based on the noise characteristics around touch screen 320. A divider 605 can perform a division operation on the two phase increment values to obtain the scaling factor, DPPC_CAL/DPPC_SEL for the current stimulation signal 316. The scaling factor can be stored in a scale register 607. Referring to equation (12), the scaling factor can be multiplied by the value stored in a register RFB_CAL_REG 609 representing $R_{FB\_CAL}$ to determine the value RFB_SEL_REG representing $R_{FB\_sel}$ to set RFB_REG 519. Auto-scaler 600 can perform the multiplication with multiplier 611 obtain RFB_SEL_REG for a sense channel 501. The scale register can be comprised of an integer portion and a fractional portion. The resolution of the fractional portion should match the resolution of the non-linear LUT (e.g. 6-bits for a LUT having 2^6 entries) and the integer portion should provide sufficient resolution to cover the frequency range (e.g. 3 bits for a 7:1 frequency range, from 115 KHz to 795 KHz, for example). Registers DPPC_CAL and DPPC_SEL can be 13 bit registers. The phase increment DPPC can be related to $F_{STIM}$ as follows:

$$DPPC = 2^{NRES\_DPCC} \cdot \frac{\omega_{STM}}{\omega_{DAC\_CLK}} \quad (13)$$

Where NRES_DPPC can be the resolution of the transmit NCO's phase accumulator (e.g. 16 bits), $\omega_{STM}$ is the stimulus frequency in radians and $\omega_{DAC\_CLK}$=transmit NCO DAC's clock frequency in radians. The multiplier result can be 15 bits, for example, the lower 6 bits represent the fractional result of the multiplication and the upper 5 bits, are redundant as will be shown below.

In an exemplary implementation, RFB_REG_CAL can be 9, FSTM_CAL can be 795 KHz and FSTM_SEL can be 115 KHz. Assuming that the non-linear LUT is 6 bits, the scale register would be ROUND(FSTM_CAL/FSTM_SEL*2^6)= 442, which corresponds to a value of 6.90625. Therefore, the RFB_REG_SEL value would be ROUND((442*RFB_REG_CAL)/2^6)=63. Note that the upper 3 bits of the multiplication result are typically not utilized since RFB_SEL at the lower frequency limit is typically set to maximum required RFB at that particular stimulus frequency (e.g. 115 KHz).

In some embodiments, a linear scaling of a parameter such as $R_{FB}$ may be all that is needed to modify the $R_{FB}$ value of $R_{FB}$ 519. For example, preamp 502 may be able to set $R_{FB}$ 519 by receiving an instruction including the $R_{FB\_sel}$ value, or some linearly scaled representation of the $R_{FB\_sel}$ value. However, different preamps can have different adjustment processes, including nonlinear adjustment processes. For example, a manufacturer of preamp 502 may provide an $R_{FB}$ adjustment process that yields a constant change in pre-amp gain (e.g. 10%) for an incremental $R_{FB}$ adjustment value, which has the transfer function:

$$R_{FB}=R_{FB\_}\text{lo}*(1+R_{FB\_}\text{GRAN})^{R_{FB\_}\text{REG}} \quad (14)$$

where $R_{FB}$_REG is the $R_{FB}$ register value; $R_{FB}$_lo is the lowest $R_{FB}$ value for $R_{FB}$_REG=0; and $R_{FB}$_GRAN the $R_{FB}$ or gain step (e.g. 5%) per $R_{FB}$_REG increment.

In some embodiments, a manufacturer of preamp 502 may provide an $R_{FB}$ adjustment process that yields a pre-amp gain change that may vary within certain limits (e.g 1% to 10%) across the $R_{FB}$ adjustment value range. Using a constant gain step can have advantages over variable gain step per $R_{FB}$ increment as the bit resolution necessary for such adjustment for a given maximum gain step is reduced in respect to an adjustment process where the gain step is not constant. Independent of the implementation of the $R_{FB}$ adjustment process, the relationship between pre-amplifier gain as a function of $R_{FB}$ may not be linear. Therefore the present example can utilize an additional scaling in the case that the process of adjusting $R_{FB}$ 519 is nonlinear. In other words, for nonlinear adjustment processes, an additional, nonlinear scaling may be used to convert a linearly scaled parameter, such as $R_{FB\_sel}$, into a corresponding adjustment value that can be used by the preamp's adjustment process. In the present example, the $R_{FB\_sel}$ value at the output of multiplier 611 can be scaled by a look-up table (LUT) 613 to obtain an adjustment value. The entries of LUT 613 can represent a transfer function of the parameter adjustment process of preamp 501 that has been calibrated to the calibration frequency $\omega_{STIM\_cal}$, such that the LUT transforms the $R_{FB\_sel}$ value directly into an $R_{FB\_sel\_scaled}$ adjustment value conforming to the particular adjustment process of preamp 501. LUT 613 transmits the resulting $R_{FB\_sel\_scaled}$ adjustment value to preamp 502 in accordance with the preamp's adjustment process to set the value of $R_{FB}$ 519. In this way, LUT 613 operates as an adjuster that applies the scaled adjustment value $R_{FB\_sel\_scaled}$ to the adjustment process of the preamp, such that the frequency dependency of the preamp is modified according to the predetermined frequency characteristic, which is frequency independence in the present example. The LUT 613 may also be utilized to compensate for other frequency dependencies introduced by the panel.

In the present example, receive section 307 can include 10 sense channels 501, with each sense channel including a preamp 502. Receive section 307 also includes 10 auto-scalers 600, one for each sense channel 501. In another example embodiment, a single pipelined auto-scaler may be used instead of multiple non-pipelined auto-scalers.

Figure 7:
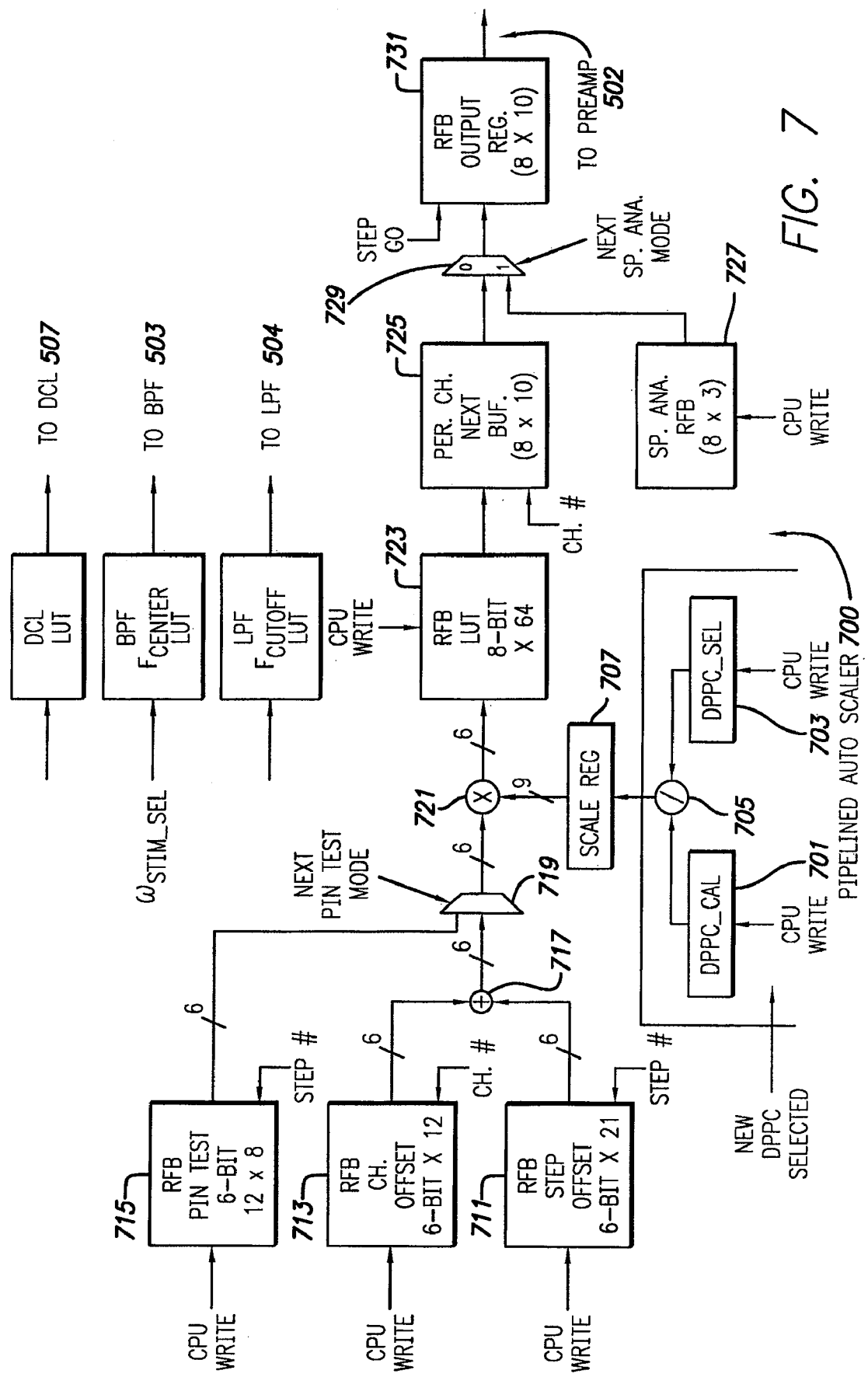
FIG. 7 illustrates an example pipelined auto-scaler according to embodiments of the disclosure.

FIG. 7 shows another example embodiment including an example pipelined auto-scaler 700. Similar to the operation of auto-scaler 600 above, a register 701 and a register 703 store the values of the calibrated phase increment DPPC_CAL and currently selected phase increment DPPC_SEL, respectively. A divider 705 divides the two phase increment values to obtain the scaling factor, which is stored in a scale register 707. The scale value is a 9 bit value, the 3 MSBs represent the integer portion, the 6 LSBs the fractional portion.

However, instead of having an auto-scaler for each sense channel, pipelined auto-scaler 700 includes a pipeline system that can calculate $R_{FB\_sel}$ values for a plurality of sense channels. In order to detect touch, each of the sense channels of touch screen 320 can be scanned 15 times, i.e., 15 steps, for example. In the present embodiment, pipelined auto-scaler 700 can calculate $R_{FB\_sel}$ values for all of the 10 sense channels for each step in a scan of touch screen 320. Different $R_{FB\_sel}$ values can be required for different sense channels due to, for example, differences in pixel capacitances CSIG on those sense lines. Therefore, while the preamps in the sense channels may all be calibrated based on the same $\omega_{STIM\_cal}$, the preamps may have different values for $R_{FB\_cal}$.

For each step in a scan of touch screen 320, pipelined auto-scaler 700 can calculate an $R_{FB\_sel}$ value for each of the 10 sense channels. This pipeline system of pipelined auto-scaler 700 can include an FSM (Finite State Machine) 709, and various registers, buffers, and operators, such as multipliers and adders, which will now be described in more detail. FSM 709 can set the channel number of an $R_{FB}$ channel offset register 713 that stores $R_{FB}$ data of each sense channel, and a per channel next buffer 725 that stores $R_{FB\_sel\_scaled}$ for a current channel. FSM 709 can also set the step number of an $R_{FB}$ step offset register 711 that stores $R_{FB}$ data of each step, and an $R_{FB}$ pintest register 715.

At the beginning of a scan, FSM 709 can set a step number to 1 and can increment channel number from 1 through a total number of channels, which is 10 in the present example. At each channel number, $R_{FB}$ channel offset register 713 can output a corresponding $R_{FB}$ channel data value and $R_{FB}$ step offset register 711 can output an $R_{FB}$ step data value for step 1. Adder 717 can add the data values, and multiplexer 719 can transmit the result to a multiplier 721. The result of the addition can be 7 bits, where the most significant bit is a overflow bit, but only the 6 least significant bits are used as the combined value from channel offset register 713 and step offset register 711 are chosen such that the result doesn't exceed a value of 63. Multiplier 721 can multiply the result by the scaling factor and can transmit the resulting $R_{FB\_sel}$ value to an $R_{FB}$ LUT 723. The result of the multiplication is 15 bits but only bits 6 to 11 are passed on to LUT 723 according to FIG. 6. $R_{FB}$ LUT 723 can nonlinearly scale $R_{FB\_sel}$ based on the transfer function of the adjustment process of preamp 502. The resulting $R_{FB\_sel\_scaled}$ value can be stored in per channel next buffer 725. When per channel next buffer 725 contains values for all 10 channels, the values can be copied into an $R_{FB}$ output register for transmission to the corresponding channel's preamp. The process can repeat as FSM 709 increments step number through a total number of steps to generate $R_{FB\_sel\_scaled}$ values for each sense channel and each step of the scan.

Figure 8:
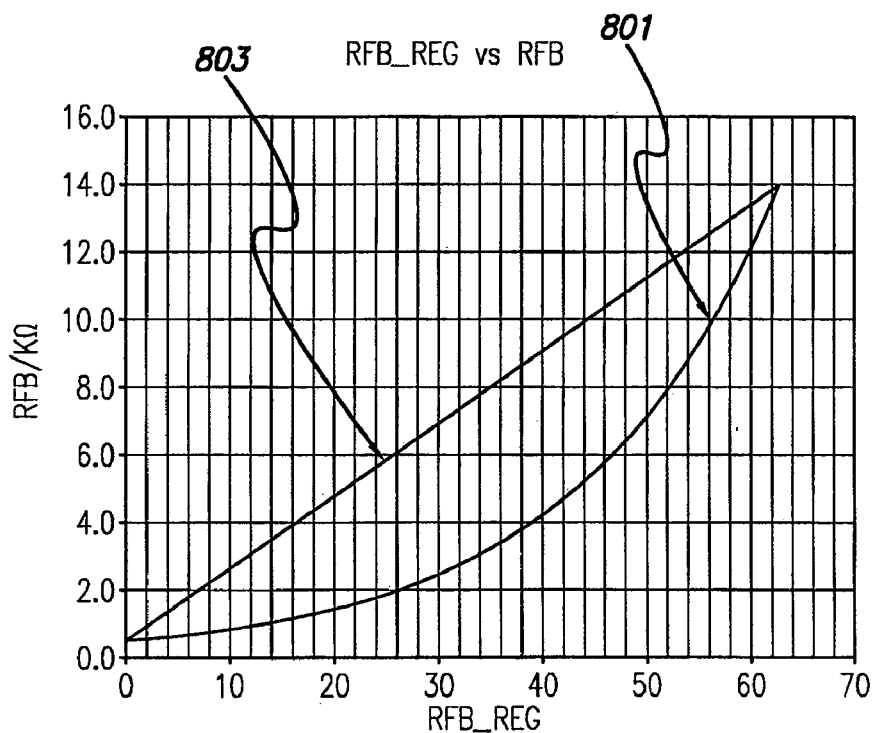
FIG. 8 illustrates example transfer functions according to embodiments of the disclosure.

FIG. 8 shows the frequency transfer function 801 according to equation (7) for $R_{FB}$_lo=0.5 KΩ, $R_{FB}$_GRAN=5.43% and a 6-bit $R_{FB}$_REG adjustment. Parameter $R_{FB}$_GRAN can be largely independent on ASIC process variations as it is a function of the ratio of two resistors and therefore can be better controlled than, for example, absolute resistor values. However, $R_{FB}$_lo is an absolute value and therefore can be subject to the ASICs process variation. In some cases $R_{FB}$_lo can vary as much as 25% or more. In this example embodiment, the goal is to adjust $R_{FB}$(C,S), where C is the selected channel and may vary from 0 to 9, and S is the step and may vary from 0 to 14, for example, so that it yields a certain pixel target value NPIX_TARG(R,C), where R=0 to 14 and C=0 to 9, for example, for each pixel in the pixel array. Since the value of $R_{FB}$ may not be directly measurable it becomes necessary to relate $R_{FB}$ to a parameter that can be measured, such as the pixel value NPIX, where:

$$NPIX=a*R_{FB} \quad (15)$$

Here, a is simply a scaler.

In order to derive the non-linear transfer function in the lookup table 613 it can be practical to derive the linear transfer function, which has the form:

$$NPIX\_AVG=m_{PIX}*R_{FB}\_REG+NPIX\_LO\_AVG \quad (16)$$

The term $m_{PIX}$ is the slope of the ideal linear transfer function and is defined as:

$$m_{PIX}=(NPIX\_HI\_AVG-NPIX\_LO\_AVG)/(R_{FB}\_REG(Max)) \quad (17)$$

NPIX_HI_AVG is the average pixel value at the maximum setting of $R_{FB}\_REG$ and is equivalent to $a*R_{FB}\_HI$; NPIX_LO_AVG is the lowest average pixel value at the minimum setting of $R_{FB}\_REG$ and is equivalent to $a*R_{FB}\_LO$; and $R_{FB}\_REG(Max)$ is the maximum setting of register $R_{FB}\_REG$. The linear transfer function 803 is shown in FIG. 8.

With the substitution NPIX_AVG=$a*R_{FB}\_AVG$, equation (14) can now be rewritten as follows:

$$NPIX\_AVG=NPIX\_LO\_AVG*(1+R_{FB}\_GRAN)^{R_{FB}\_REG} \quad (18)$$

Substitution of $R_{FB}\_REG=F(R_{FB}\_REG)$ into equation (16) and combination of equations (16) and (18) obtains the equation for the non-linear LUT transfer function necessary to linearize the non-linear adjustment process for the $R_{FB}$ adjustment:

$$m_{PIX}*R_{FB}\_REG\_IN+NPIX\_LO\_AVG=NPIX\_LO\_AVG*(1+R_{FB}\_GRAN)^{f(R_{FB}\_REG)} \quad (19)$$

Solving for $f(R_{FB}\_REG)$:

$$f(R_{FB}\_REG)=LOG((m_{PIX}*R_{FB}\_REG+NPIX\_LO\_AVG)/NPIX\_LO\_AVG)/LOG(1+R_{FB}\_GRAN)) \quad (20)$$

Figure 9:
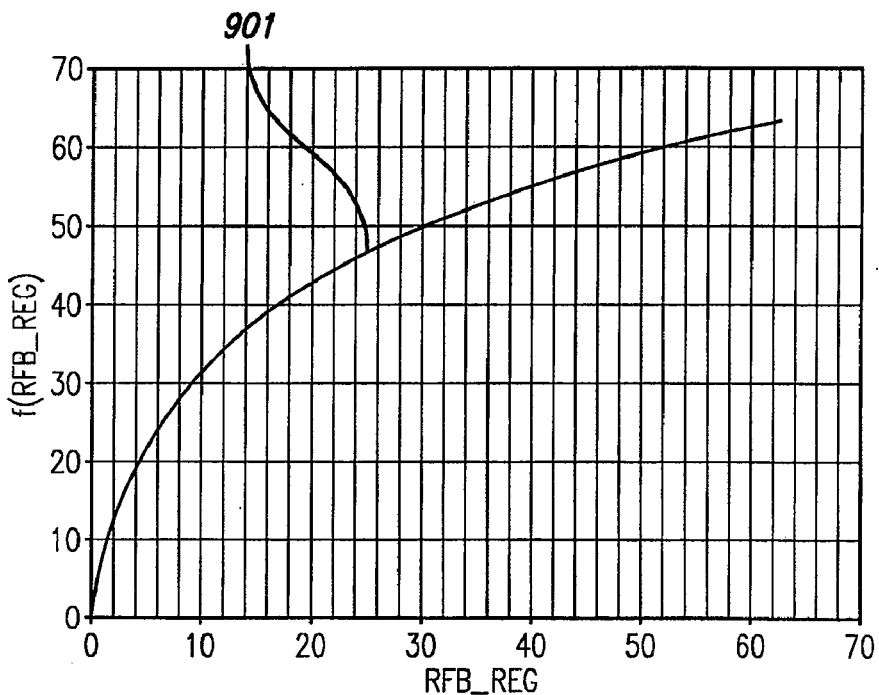
FIG. 9 illustrates another example transfer function according to embodiments of the disclosure.

Note that $R_{FB}\_GRAN$ can be independent of ASIC process. FIG. 9 shows a plot of the non-linear transfer function 901.

Figure 10:
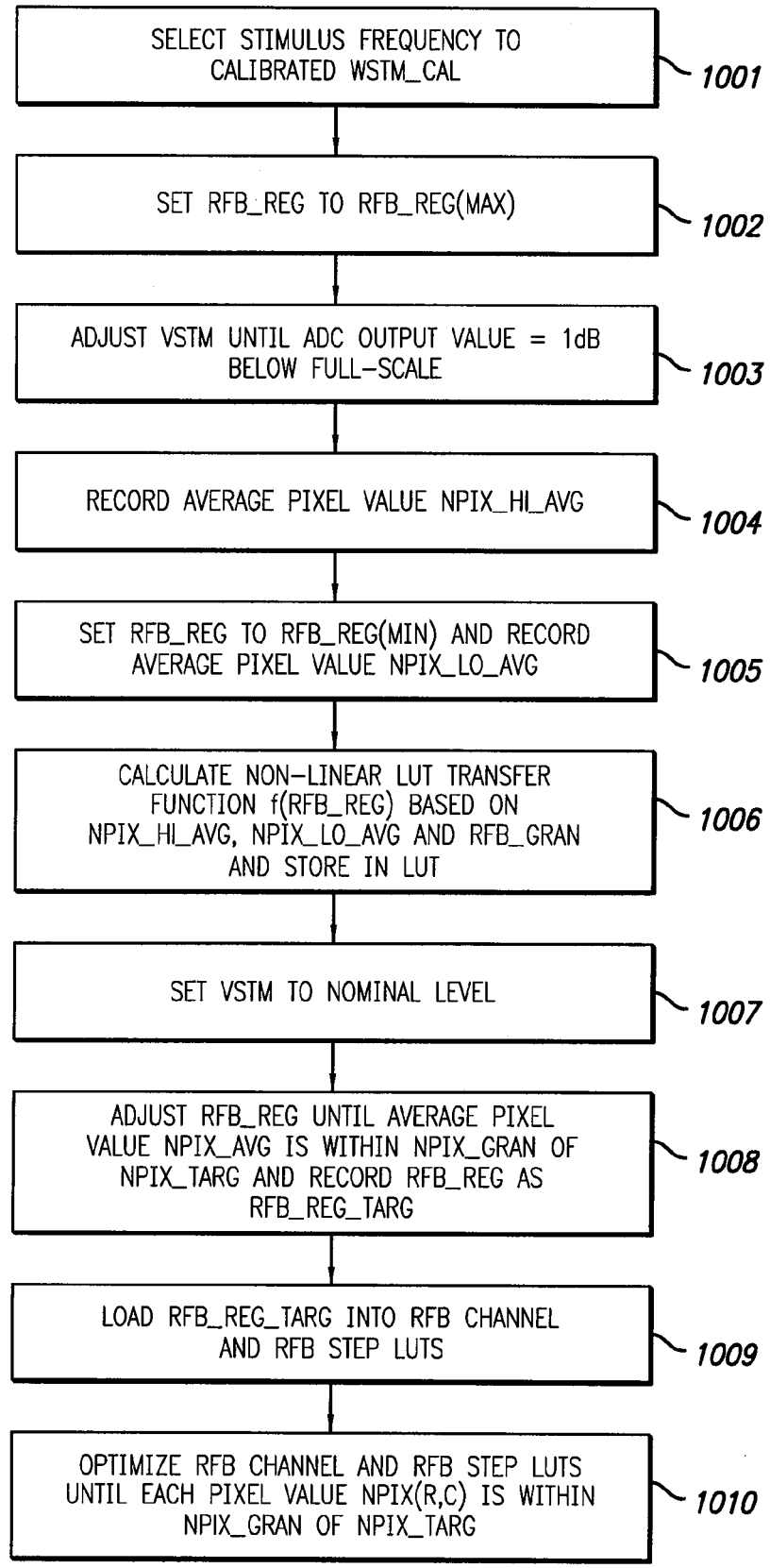
FIG. 10 illustrates an example calibration process according to embodiments of the disclosure.

FIG. 10 is a flowchart of an example calibration process for an embodiment in which preamps 502 of sense channel 501 have adjustment process transfer functions according to equation (20). Initially, stimulus frequency can be set to wstim_cal (1001) at the high end of the operating stimulus frequency range for a given application. $R_{FB}$ can be adjusted to the highest value by setting $R_{FB}\_REG$ to the maximum setting (1002). The VSTM voltage amplitude can be adjusted to yield an ADC output value of 1 dB below full-scale (1003). This may be necessary to ensure that the analog front-end channel remains within its linear operating range during the initial calibration procedure. The average pixel value NPIX_HI_AVG can be recorded by reading all pixel values NPIX (row,col) and then averaging the pixel values. The $R_{FB}\_REG$ can then be set to the minimum value (1005) and the corresponding average pixel value NPIX_LO_AVG can be recorded. Based on the foregoing equations and parameter $R_{FB}\_GRAN$ the lookup table values can then be calculated for each setting of $R_{FB}\_REG$ according to equation (19) and finally, the lookup table 613 can be loaded, which is shown in step (1006). The final calibration can be performed after setting VSTM to the nominal level (1007). $R_{FB}\_CAL\_REG$ can be adjusted until the average pixel value NPIX_AVG is within the granularity NPIX_GRAN of the pixel target value NPIX_TARG (1008). The corresponding value can be recorded as $R_{FB}\_REG\_TARG$ and then loaded into the $R_{FB}$ CHANNEL LUT 713 and $R_{FB}$ STEP LUT 711 (1009) as a seed value. In the final calibration step (1010) $R_{FB}$ CHANNEL LUT 713 and $R_{FB}$ STEP LUT 711 (1009) can be optimized around the $R_{FB}\_REG\_TARG$ seed value such that every pixel value NPIX(R,C) is within the granularity NPIX_GRAN of the pixel value NPIX_TARG.

Figure 11:
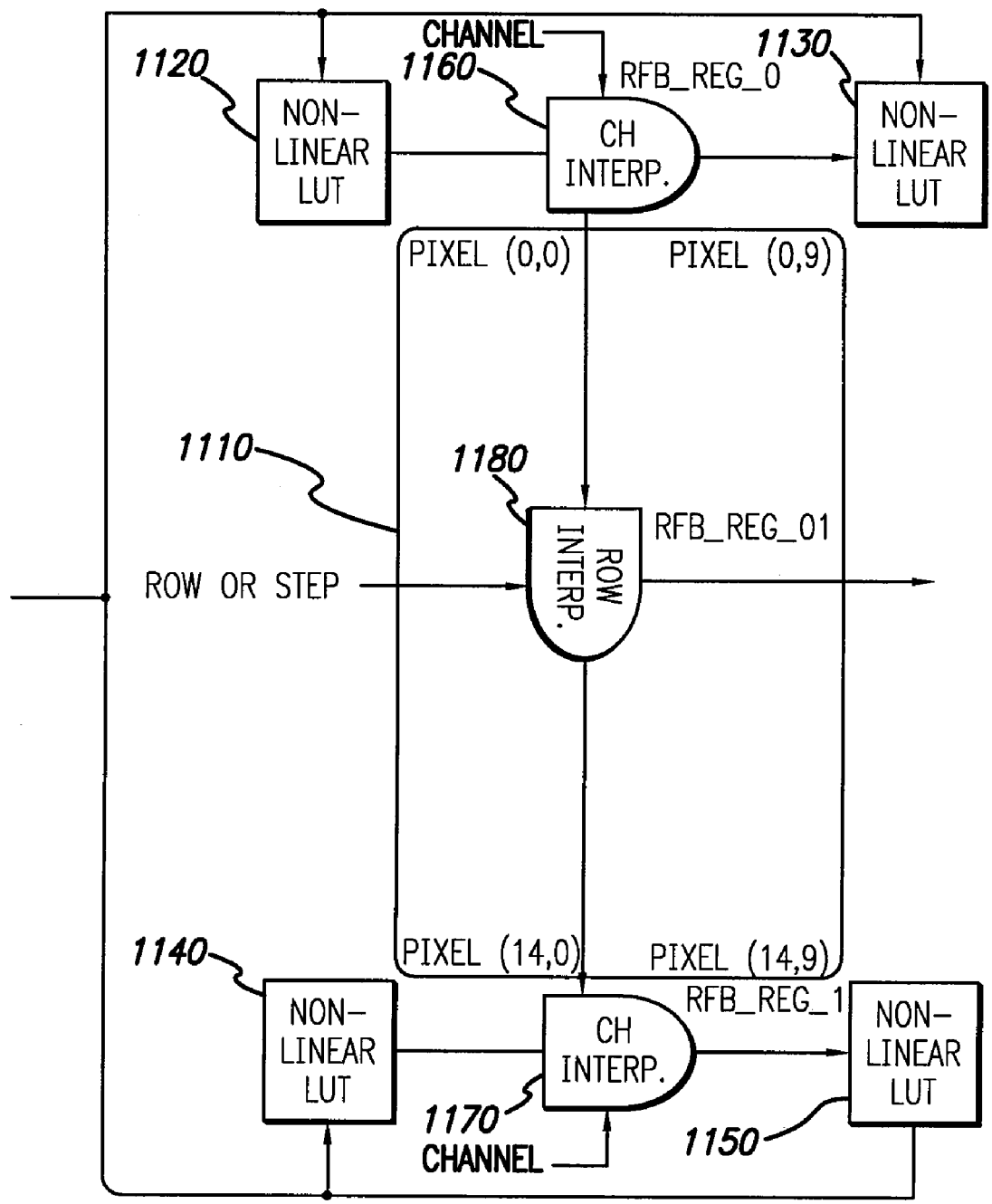
FIG. 11 illustrates an example of linear interpolation for a sensor panel.

FIG. 11 shows an example of linear interpolation for a sensor panel 1110 to compensate for the gain transfer function of the panel and associated adjustment of the TIA gain. This example illustrates a case in which one row at a time is stimulated (single stimulus). Here, non-linear LUT 1120 can store the transfer function for pixel (0,0), which not only takes into account the frequency dependency of the gain imposed by the non-linear $R_{FB}$ adjustment but also the frequency dependency of the panel gain at a given pixel. Similarly, non-linear LUTs 1130, 1140 and 1150 can store the transfer functions for pixels (0,9), (14,0) and (14,9), respectively. Channel interpolators 1160 and 1170 can generate interpolated values $R_{FB}\_REG\_0$ and $R_{FB}\_REG\_1$, respectively, at a given frequency wstm_sel for a given channel, and row interpolator 1180 can interpolate those values and generate $R_{FB}\_REG\_01$ based on the selected row. Suppose the gain transfer function of pixel(0,0) may be given by:

$$H_{00}(\omega) = \frac{1}{\sqrt{1+(\omega_{STM\_SEL} \cdot R_{00} \cdot C_{00})^2}} \quad (21)$$

where: R00 is the effective resistance of the low-filter element at pixel (0,0) and C00 is the effective capacitance of the low-pass filter element at pixel (0,0)

In this example, it is desired that the pre-amp gain makes up for the gain of the panel. The adjusted $R_{FB}$ value needed to compensate for the gain variation in the panel can be calculated by equating the gain transfer function of the TIA with the inverse of the approximate frequency transfer function in equation (21) or $$R_{FB\_00} \cdot C_{SIG} \cdot \omega_{STM\_SEL} = \sqrt{1+(\omega_{STM\_SEL} \cdot R_{00} \cdot C_{00})^2} \quad (22)$$

From equation (22), the following is obtained:

$$R_{FB\_00} = \sqrt{\frac{1+(\omega_{STM\_SEL} \cdot R_{00} \cdot C_{00})^2}{(C_{SIG} \cdot \omega_{STM\_SEL})^2}} \quad (23)$$

In order to compensate for the non-linear gain transfer function in equation (23), LUT transfer function stored in LUT 1120 can be derived in order to maintain constant gain that is frequency independent. The example linearization technique described earlier may be applied to calculate LUT transfer function for a given panel location.

Referring again to FIGS. 5-7, the modification of BPF 503 parameters by auto-scaler 600/700 will now be discussed. FIG. 5 shows auto-scaler 600/700 can modify multiple components of preprocessing channel 313. In the present example, auto-scaler 600/700 can modify the center frequency $f_{center}$ of BPF 503. In particular, the bandpass center frequency $\omega_{STIM\_center}$ can be "tuned" to $\omega_{STIM\_sel}$ so the stimulus signal can pass through the analog-front end channel without attenuation while suppressing unwanted noise components outside the pass-band of the bandpass filter. In one example implementation the bandpass filter center frequency can be:

$$\omega_{CENTER} = \frac{1}{R_{BPF} \cdot C_{BPF}} \quad (24)$$

Where $R_{BPF}$ is the composite and constant band-pass filter resistance and $C_{BPF}$ is the composite and adjustable bandpass filter capacitance and can be defined as:

$$C_{BPF}=C_{BPF\_LO} \cdot (1+C_{BPF\_GRAN})^{FCODE} \quad (25)$$

Where FCODE_REG is the register that controls the center frequency of the bandpass filter; $C_{BPF}\_LO$ is the band-pass filter capacitance at the lowest FCODE register setting; and $C_{BPF\_GRAN}$ is the granularity of the $C_{\_BPF}$ adjustment.

By combining equations (24) and (25), the following is obtained:

$$\omega_{CENTER} = \frac{1}{R_{BPF} \cdot C_{BPF\_LO} \cdot (1 + C_{BPF\_GRAN})^{FCODE}} \quad (26)$$

It can be practical to linearize the non-linear BPF center frequency adjustments by finding the non-linear BPF look-up table function that yields the linear transfer function:

$$\omega_{CENTER} = m_{FCODE} \cdot FCODE + \omega_{CENTER\_LO} \quad (27)$$

Here the slope $m_{FCODE}$ is defined as:

$$m_{FCODE} = \frac{\omega_{CENTER\_HI} - \omega_{CENTER\_LO}}{FCODE\_REG\_LO - FCODE\_REG\_HI} \quad (28)$$

$\omega_{CENTER\_HI}$ is the center frequency in radians at the setting of FCODE_REG_LO;
$\omega_{CENTER\_LO}$ is the center frequency in radians at the lowest setting of FCODE_REG_HI.

By combining equations (26) and (27) and replacing FCODE_REG in equation (26) with f(FCODE_REG), the following is obtained:

$$f(FCODE\_REG) = \quad (29)$$
$$\frac{\log(1) - \log(\tau_{BPF} \cdot (m_{FCODE} \cdot FCODE + \omega_{CENTER\_LO}))}{\log(1 + C_{BPF\_GRAN})}$$

with the substitution:

$$\tau_{BPF} = R_{BPF} \cdot C_{BPF\_LO} \quad (30)$$

and FCODE_LO<FCODE_REG<FCODE_HI $\tau_{BPF}$ can be found by setting FCODE_REG to 0 and then varying the stimulus frequency until the center frequency matches the stimulus frequency, which is the case when the signal at the output of the bandpass filter becomes maximum. Equation (26) then simplifies to:

$$\omega_{CENTER}(MIN) = \frac{1}{\tau_{BPF}} \quad (31)$$

$\tau_{BPF}$ can then be calculated as follows:

$$\tau_{BPF} = \frac{1}{\omega_{CENTER}(MIN)} \quad (32)$$

Figure 12:
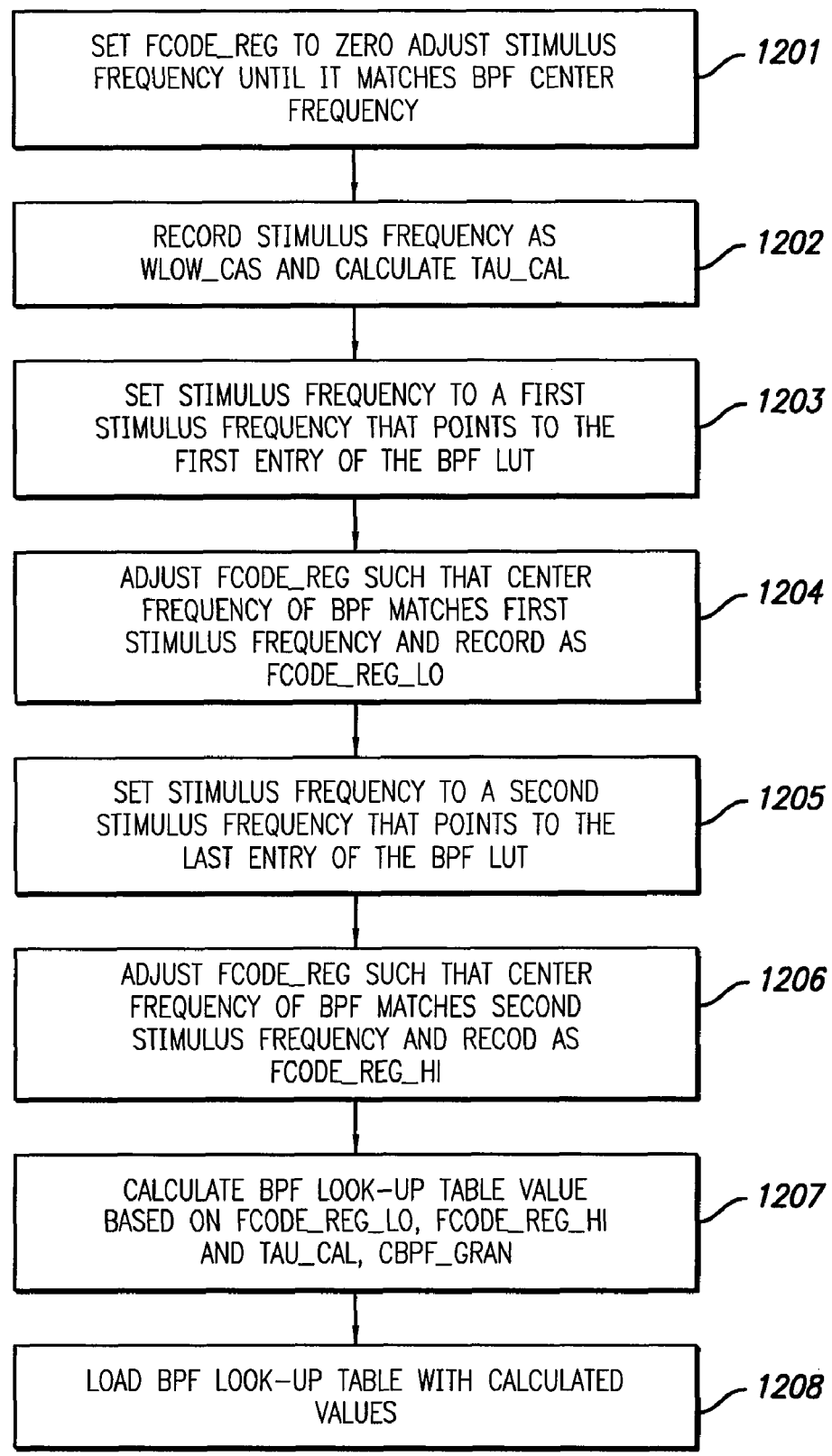
FIG. 12 illustrates a flowchart of an example bandpass filter adjustment algorithm.

FIG. 12 is a flowchart of an example BPF adjustment algorithm. In order to find parameter $\tau_{BPF}$, FCODE_REG can be set to zero and $\omega_{STM}$ can be adjusted (1201) until it matches the center frequency of the bandpass filter $\omega_{CENTER}$. Then $\tau_{BPF}$ can be calculated (1202) according to equation (32). The stimulus frequency can be set (1203) to a first stimulus frequency, which corresponds to the first BPF lookup table entry. The FCODE_REG can be varied (1204) until the bandpass filter center frequency matches the first stimulus frequency and then recorded as FCODE_REG_LO. Then the stimulus frequency can be set (1205) to a second stimulus frequency that corresponds to the last bandpass filter lookup table entry, and the FCODE_REG value can be adjusted (1206) until the bandpass filter center frequency matches the second stimulus frequency and recorded as FCODE_REG_HI. The remaining bandpass-filter lookup table values can then be calculated (1207) by using equation (32) and measured parameters FCODE_REG_LO, FCODE_REG_HI, $\tau_{BPF}$ and then loaded (1208) into the bandpass filter lookup table.

Figure 13:
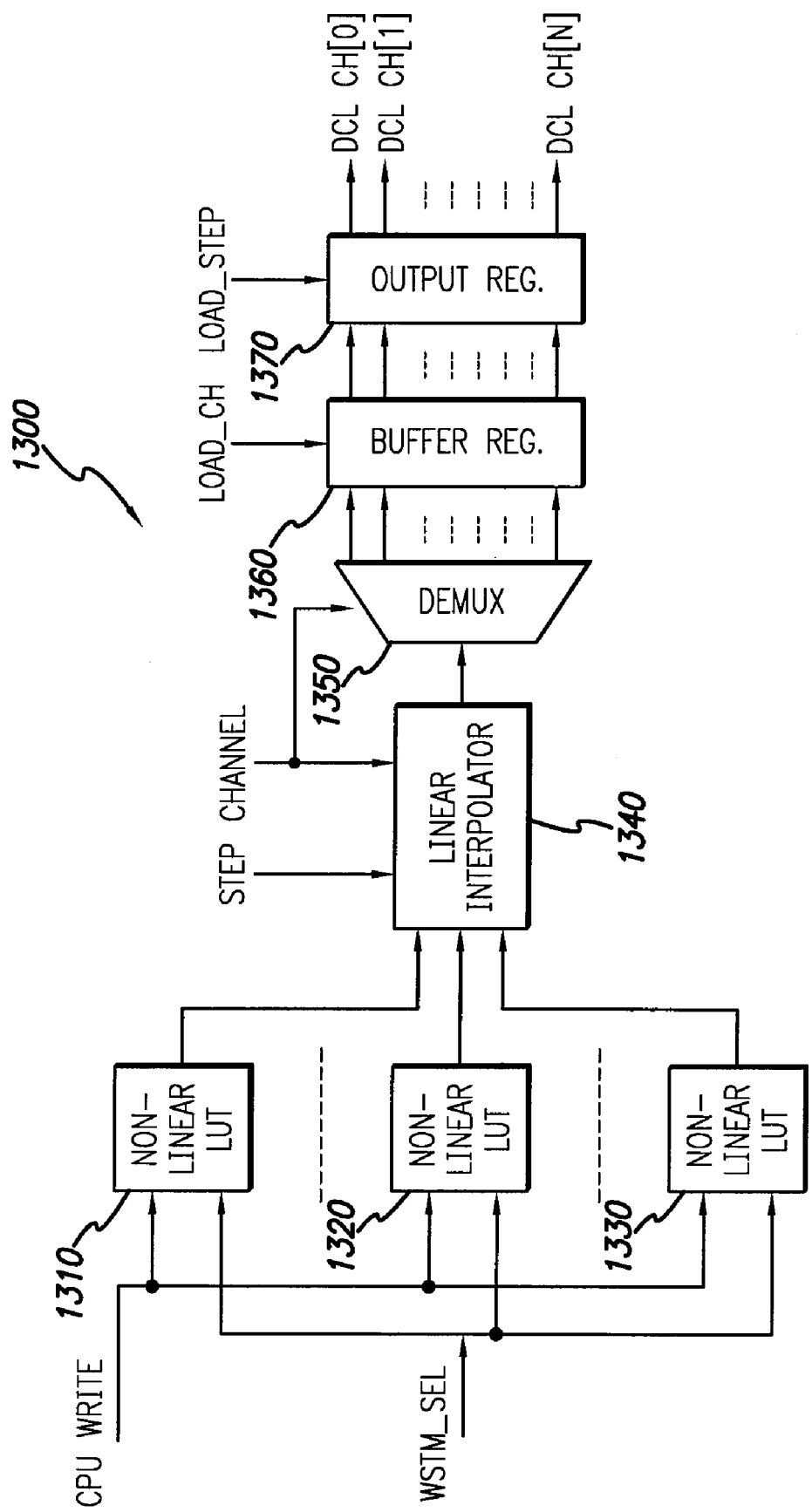
FIG. 13 illustrates a block diagram of an example DCL adjustment circuit.

FIG. 13 is a block diagram of an example DCL adjustment circuit 1300, including non-linear LUTS 1310, 1320, and 1330, a linear interpolator 1340, a demultiplexer (DEMUX) 1350, a buffer register 1360, and an output register 1370. Delay adjustment via the DCL parameter can be used to compensate for the phase-shift imposed on the stimulus by the sensor panel. The relationship between DCL and the stimulus phase is:

$$\varphi_{DCL} = DCL \cdot f_{STM} \cdot \frac{2 \cdot \pi}{f_{ADC\_CLK}} = DCL \cdot \frac{\omega_{STM}}{f_{ADC\_CLK}} \quad (33)$$

Where: $\phi_{DCL}$=the phase-shift imposed on the stimulus as a function of DCL; $\omega_{STM}$ is the stimulus frequency; fADC_CLK is the ADC sampling clock.

Figure 14:
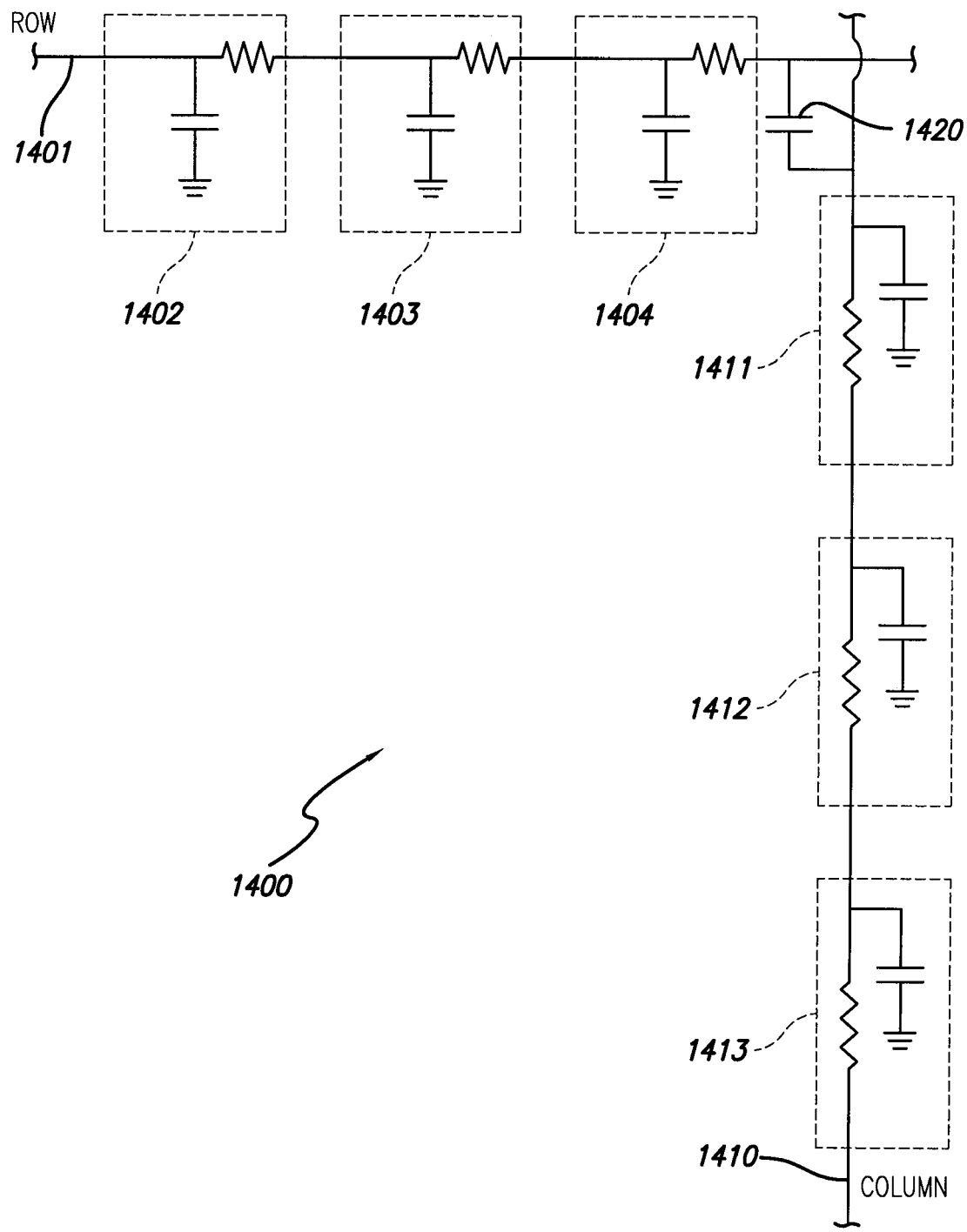
FIG. 14 illustrates a model of an example touch sensing panel.
Figure 15:
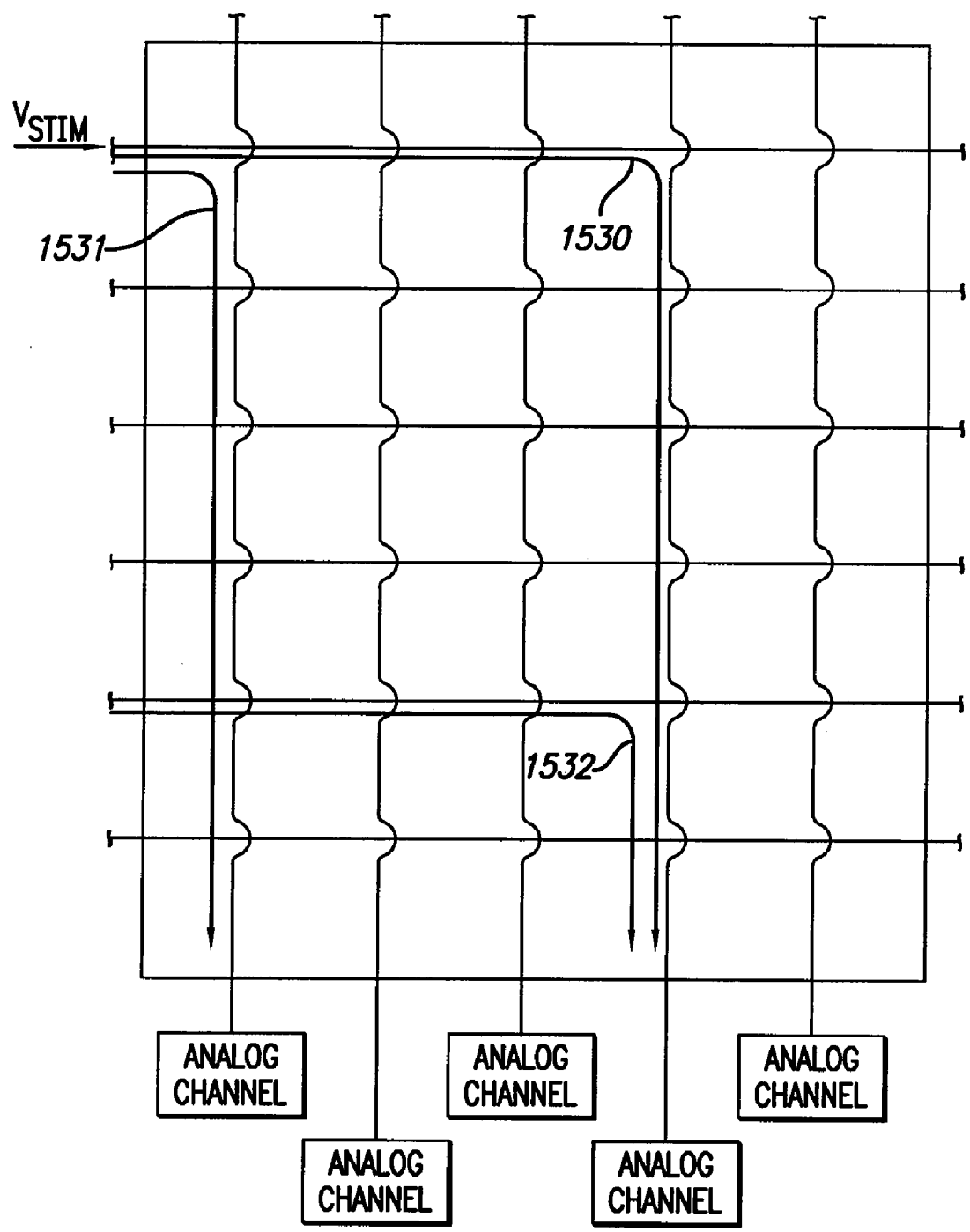
FIG. 15 illustrates an example showing variation in the delay imposed on a stimulus path through a touch sensing panel.
Figure 16:
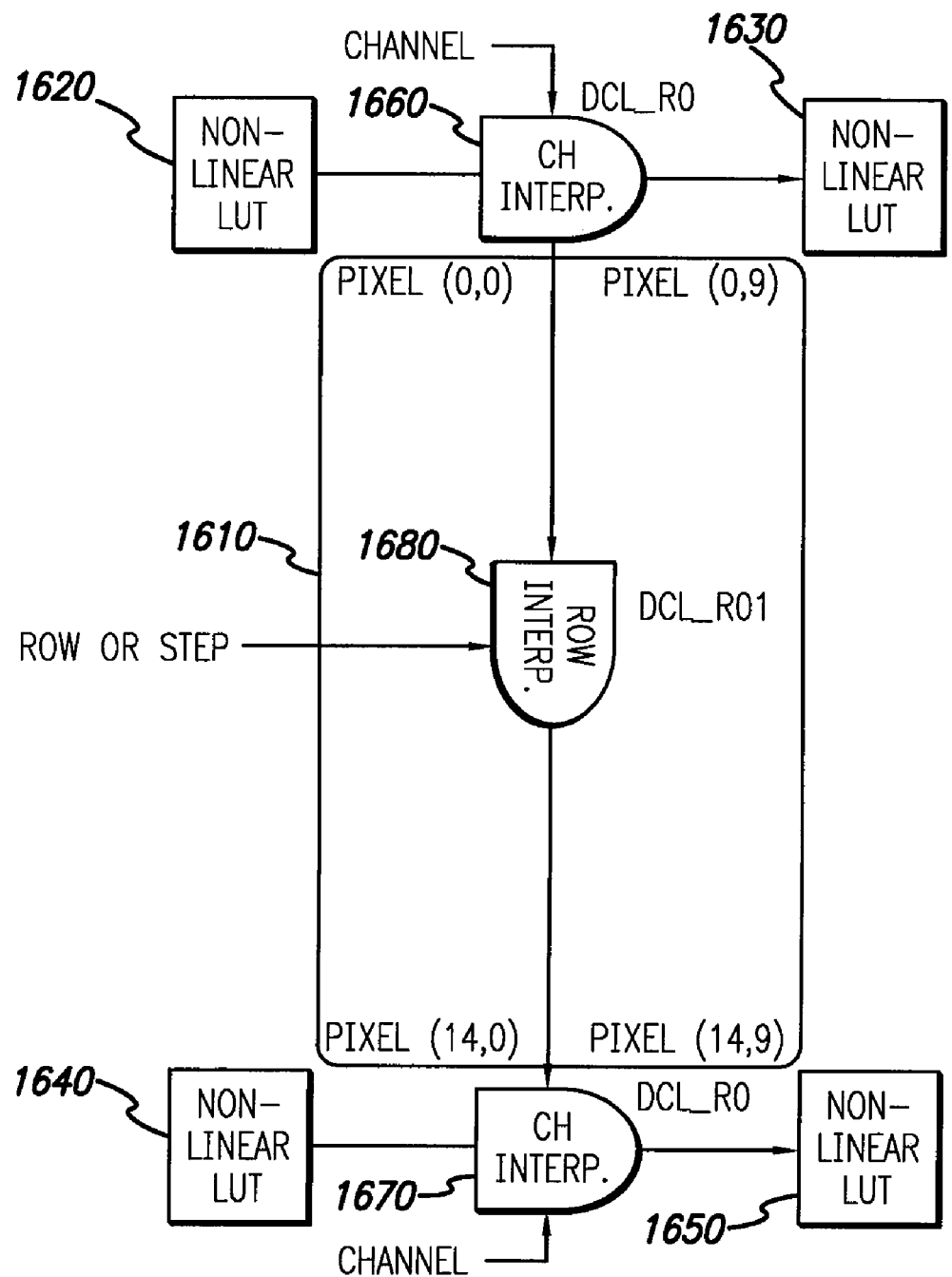
FIG. 16 illustrates another example of linear interpolation for a sensor panel.

FIG. 14 shows a model of an example touch sensing panel 1400. Each row 1401 can be represented by multiple cascaded low-pass filter elements, such as low-pass filter elements 1402, 1403, and 1404. Similarly, sense line 1410 can be comprised of multiple cascaded low-pass filter elements, such as low-pass filter elements 1411, 1412, and 1413. CSIG 1420 represents the point at which drive and sense line intersect. Each low-pass filter element can represent one pixel. The delay adjustment needed for a given drive sense line combination can be different. For example, in FIG. 15 the delay imposed on the stimulus through path 1530 can be greater than for path 1531, and also greater than for path 1532, since the paths 1531 and 1532 can be shorter than path 1531, and the signal can be passing through fewer low-pass filter elements. Therefore, the phase transfer function for each pixel can be different. In order to reduce the memory requirements, it can suffice to approximate the phase transfer function for a given pixel by linear interpolation. FIG. 16 shows an example of linear interpolation for a sensor panel 1610 where one row at a time can be stimulated (single stimulus). Here non-linear LUT 1620 can store the phase transfer function for pixel (0,0). Similarly, non-linear LUTs 1630, 1640 and 1650 can store the phase transfer function for pixels (0,9), (14,0) and (14,9), respectively. Channel interpolators 1660 and 1670 can generate interpolated values DCL_R0 and DCL_R1, respectively, at a given frequency wstm_sel for a given channel and row interpolator 1680 can interpolate those values and generate DCL_R01 based on the selected row. For each step this process would be performed a total of 10 times, i.e. once for every channel, in this example. Therefore, signal LOAD_CH would be asserted a total of 10 times per step and the output register would be updated at the end of the current step by asserting signal LOAD_STEP. Suppose the phase transfer function of pixel(0,0) may be given by:

$$\phi_{DCL} = -\arctan(\omega_{STM} R_{00} \cdot C_{00}) \quad (34)$$

where: R00 is the effective resistance of the low-filter element at pixel (0,0) and C00 is the effective capacitance of the low-pass filter element at pixel (0,0) DCL for the panel imposed phase shift in the look-up table 1620 could then be calculated by combining equations (33) and (34):

$$DCL(\omega_{STM}) = -\frac{f_{ADC\_CLK} \cdot \arctan(\omega_{STM} \cdot R_{00} \cdot C_{00})}{\omega_{STM}} \quad (35)$$

Figure 17:
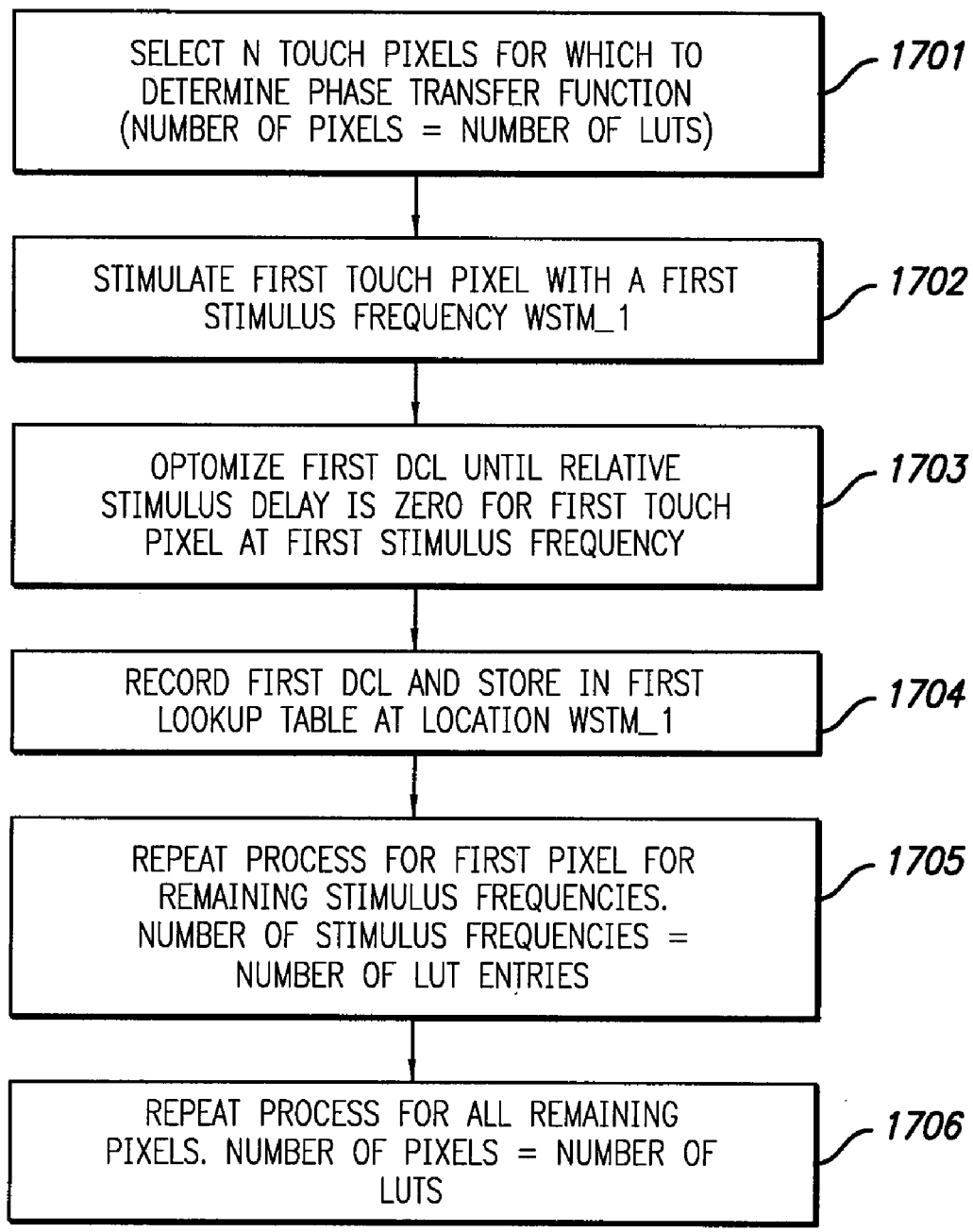
FIG. 17 illustrates a flowchart of an example calibration algorithm for a DCL adjustment.

FIG. 17 is a flowchart of an example calibration algorithm for DCL adjustment. The calibration process can be initiated by first selecting (1701) a first pixel that is associated with a first look up table (e.g. 1620). A first frequency wstm_1 can be selected (1702) and then the first pixel can be stimulated with a first stimulus frequency wstm_1. Note that wstm_1 can be the digital presentation of the stimulus frequency and can typically be a phase_increment for an NCO. A first DCL value can be found (1703) to compensate for the phase delay that can be imposed by the panel on the stimulus signal for first pixel. A first DCL can be recorded (1704) and stored in first lookup table at location pointed to by first stimulus frequency wstm_1. This process can be repeated (1705) until DCLs for all remaining stimulus frequencies wstm_2 . . . wstm_n have been found, whereas n is the total number of entries in first lookup table. Once calibration values for first lookup table have been found, DCL values for the remaining n look-up tables can be found (1706) in a similar fashion, whereas n is the total number of lookup tables.

FIG. 18A illustrates an example mobile telephone 1836 that can include touch sensor panel 1824 and display device 1830, the touch sensor panel including a touch pixel design according to one of the various embodiments described herein.

FIG. 18B illustrates an example digital media player 1840 that can include touch sensor panel 1824 and display device 1830, the touch sensor panel including a touch pixel design according to one of the various embodiments described herein.

FIG. 18C illustrates an example personal computer 1844 that can include touch sensor panel (trackpad) 1824 and display 1830, the touch sensor panel and/or display of the personal computer (in embodiments where the display is part of a touch screen) including a touch pixel design according to the various embodiments described herein.

While various embodiments have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various example embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described example embodiments.

For example, one or more of the functions of computing system 300 described above can be performed by firmware stored in memory (e.g. one of the peripherals 304 in FIG. 3) and executed by touch processor 302, or stored in program storage 332 and executed by host processor 328. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

What is claimed is:

1. A method of modifying a frequency dependency of a sense signal preprocessing channel of a sensing system, the method comprising:
   linearly scaling a parameter of a first transfer function of a component of the preprocessing channel based on a frequency of the sense signal to obtain a scaled parameter value;
   nonlinearly scaling the scaled parameter value based on a second transfer function of an adjustment process of the component to obtain an adjustment value; and
   adjusting a parameter value of the component the parameter value of the component based on the scaled parameter value by performing the adjustment process based on the adjustment value.

2. The method of claim 1, wherein the parameter of the first transfer function includes an internal parameter of the component.

3. The method of claim 2, wherein the component is a preamplifier and the internal parameter includes a feedback resistance of the preamplifier.

4. The method of claim 2, wherein the component is a bandpass filter and the internal parameter includes a center frequency of the bandpass filter.

5. The method of claim 2, wherein the component is a DCL (Digital Control Logic) circuit element and the internal parameter includes a DCL parameter.

6. The method of claim 1, wherein the linear scaling is performed for a plurality of sense signal preprocessing channels, the first transfer function of each channel being based on one or more signal path lengths corresponding to one or more stimulation signals on which a sense signal of the channel is based.

7. The method of claim 6, wherein the first transfer function of each channel is stored in one or more look-up tables, and the linear scaling includes performing one of linear and non-linear interpolation based on the one or more look-up tables.

8. The method of claim 1, wherein the linear scaling and the nonlinear scaling are performed by interpolation of a single look-up table.

9. The method of claim 1, wherein the parameter of the first transfer function includes a parameter of an external device.

10. The method of claim 1, wherein the parameter is linearly scaled such that the first transfer function of the component is substantially independent of a frequency of the sense signal.

11. The method of claim 1, wherein the parameter is linearly scaled such that the first transfer function of the component substantially compensates for a frequency dependence of another component of the preprocessing channel.

12. The method of claim 1, further comprising:
performing the linearly scaling, the nonlinearly scaling, and the adjusting the parameter for each of a plurality of preprocessing channels in a pipeline process.

13. An apparatus for modifying a frequency dependency of a circuit component of a sense signal preprocessing channel of a touch sensing system, the apparatus comprising:
a first memory that stores a linear scaling factor representing a predetermined frequency characteristic of a first transfer function of the component based on a first frequency;
an operator that scales a parameter of the first transfer function with the linear scaling factor to obtain a first scaled value;
a second memory includes a plurality of entries representing a second transfer function of a parameter adjustment process of the component that has been calibrated to the first frequency, such that selecting an entry corresponding to the first scaled value returns a second scaled value; and
an adjuster that applies the second scaled value to the adjustment process of the component, such that the frequency dependency of the component is modified according to the predetermined frequency characteristic.

14. The apparatus of claim 13, wherein the parameter of the first transfer function includes an internal parameter of the component.

15. The apparatus of claim 14, wherein the component is a preamplifier and the internal parameter includes a feedback resistance of the preamplifier.

16. The apparatus of claim 14, wherein the component is a bandpass filter and the internal parameter includes a center frequency of the bandpass filter.

17. The apparatus of claim 13, wherein the parameter of the first transfer function includes a parameter of an external device.

18. The apparatus of claim 13, wherein the parameter is linearly scaled such that the first transfer function of the component is substantially independent of a frequency of the sense signal.

19. The apparatus of claim 13, wherein the parameter is linearly scaled such that the first transfer function of the component substantially compensates for a frequency dependence of another component of the preprocessing channel.

20. The apparatus of claim 13, further comprising a pipeline system comprising:
a sequencer that controls a pipeline process wherein the operator scales a plurality of parameters, each parameter corresponding to one of a plurality of preprocessing channels to obtain a plurality of the first scaled values, which are each applied to the second memory to obtain a plurality of second scaled values, which are each applied to the adjustment process of the component in the preprocessing channel of the corresponding parameter.

21. A touch sensing system comprising:
the apparatus for modifying a frequency dependency of a circuit component of a sense signal preprocessing channel of the touch sensing system of claim 13; and
a touch screen.

22. A non-transitory computer-readable storage medium storing computer-executable instructions that are executable to perform a method of modifying a frequency dependency of a sense signal preprocessing channel in a sensing system, the method comprising:
linearly scaling a parameter of a first transfer function of a component of the preprocessing channel based on a frequency of the sense signal to obtain a scaled parameter value;
nonlinearly scaling the scaled parameter value based on a second transfer function of an adjustment process of the component to obtain an adjustment value; and
adjusting the parameter of the first transfer function based on the scaled parameter value by performing the adjustment process based on the adjustment value.

23. The non-transitory computer-readable storage medium of claim 22, wherein the parameter of the first transfer function includes an internal parameter of the component.

24. The non-transitory computer-readable storage medium of claim 23, wherein the component is a preamplifier and the internal parameter includes a feedback resistance of the preamplifier.

25. The non-transitory computer-readable storage medium of claim 23, wherein the component is a bandpass filter and the internal parameter includes a center frequency of the bandpass filter.

* * * * *